(12) United States Patent
Si et al.

(10) Patent No.: US 11,864,012 B2
(45) Date of Patent: *Jan. 2, 2024

(54) METHOD AND APPARATUS FOR CORESET CONFIGURATION OF UNLICENSED BANDS

(71) Applicant: Samsung Electronics Co., Ltd., Suwon-si (KR)

(72) Inventors: Hongbo Si, Plano, TX (US); Yingzhe Li, Sunnyvale, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/809,879

(22) Filed: Jun. 29, 2022

(65) Prior Publication Data

US 2022/0338040 A1 Oct. 20, 2022

Related U.S. Application Data

(63) Continuation of application No. 17/075,477, filed on Oct. 20, 2020, now Pat. No. 11,395,167.

(60) Provisional application No. 62/957,603, filed on Jan. 6, 2020, provisional application No. 62/937,362, filed on Nov. 19, 2019, provisional application No. (Continued)

(51) Int. Cl.
*H04W 24/08* (2009.01)
*H04W 16/14* (2009.01)

(52) U.S. Cl.
CPC ............ *H04W 24/08* (2013.01); *H04W 16/14* (2013.01)

(58) Field of Classification Search
CPC ...... H04W 24/08; H04W 16/14; H04W 48/12
See application file for complete search history.

(56) References Cited

U.S. PATENT DOCUMENTS

2019/0159226 A1* 5/2019 Ly .................... H04W 72/1263
2019/0223084 A1* 7/2019 John Wilson ......... H04W 76/11
(Continued)

FOREIGN PATENT DOCUMENTS

WO 2018226054 A1 12/2018

OTHER PUBLICATIONS

Extended European Search Report dated Nov. 11, 2022 regarding Application No. 20878794.5, 7 pages.
(Continued)

*Primary Examiner* — Hassan Kizou
*Assistant Examiner* — Hector Reyes

(57) ABSTRACT

A method and apparatus in a wireless communication system is provided. The method and apparatus comprise: receiving an SS/PBCH block; determining a subcarrier spacing of the SS/PBCH block from a set of subcarrier spacings $\{SCS_1, SCS_2\}$; determining a subcarrier spacing of a Type0-PDCCH CSS set in a CORESET, the subcarrier spacing of the Type0-PDCCH CSS set is the same as the subcarrier spacing of the SS/PBCH block; determining a bandwidth and a number of symbols of the CORESET based on an MIB in the SS/PBCH block; determining a frequency offset from a set of frequency offsets $\{O_1, O_2\}$, the frequency offset is determined as being from a smallest RB index of the CORESET to a smallest RB index of the common RB overlapping with a first RB of the SS/PBCH block; determining a frequency location of the CORESET; and receiving a Type0-PDCCH.

12 Claims, 9 Drawing Sheets

Related U.S. Application Data

62/926,924, filed on Oct. 28, 2019, provisional application No. 62/925,461, filed on Oct. 24, 2019.

(56) References Cited

U.S. PATENT DOCUMENTS

| | | |
|---|---|---|
| 2019/0230534 A1 | 7/2019 | Wilson |
| 2019/0246410 A1* | 8/2019 | Zhang ............... H04W 72/0446 |
| 2019/0289530 A1* | 9/2019 | Ko ........................ H04L 5/001 |
| 2020/0120680 A1 | 4/2020 | Hwang |
| 2020/0137741 A1 | 4/2020 | Zhou |
| 2021/0127283 A1 | 4/2021 | Si |

OTHER PUBLICATIONS

Samsung, "Initial Access Signals and Channels for NR-U", 3GPP TSG RAN WG1 #98bis, Oct. 2019, R1-1910456, 12 pages.

Samsung, "Corrections on Remaining Minimum System Information", 3GPP TSG RAN WG1 Meeting AH 1801, R1-1800414, Jan. 2018, 8 pages.

"3rd Generation Partnership Project; Technical Specification Group Radio Access Network; NR; Multiplexing and channel coding (Release 15)", 3GPP TS 38.212 V15.4.0, Dec. 2018, 100 pages.

"3rd Generation Partnership Project; Technical Specification Group Radio Access Network; NR; Physical channels and modulation (Release 15)", 3GPP TS 38.211 V15.4.0, Dec. 2018, 96 pages.

"3rd Generation Partnership Project; Technical Specification Group Radio Access Network; NR; Physical layer procedures for control (Release 15)", 3GPP TS 38.213 V15.4.0, Dec. 2018, 104 pages.

"3rd Generation Partnership Project; Technical Specification Group Radio Access Network; NR; Physical layer procedures for data (Release 15)", 3GPP TS 38.214 V15.4.0, Dec. 2018, 102 pages.

"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.

Charter Communications, "Discussion on Initial Access Signals and Channels", R1-1910440, 3GPP TSG RAN WG1 Meeting #98bis, Chongqing, P.R. China, Oct. 14-20, 2019, 3 pages.

Ericsson, "Initial access signals and channels", R1-1907451, 3GPP TSG-RAN WG1 Meeting #97, Reno, USA, May 13-17, 2019, 11 pages.

Huawei, et al., "Performance enhancements for NB-IoT coexistence with NR", R1-1903912, 3GPP TSG RAN WG1 Meeting #96bis, Xian, China, Apr. 8-12, 2019, 5 pages.

International Search Report of the International Searching Authority in connection with International Application No. PCT/KR2020/014621 dated Jan. 28, 2021, 4 pages.

LG Electronics, "Physical layer design of initial access signals and channels for NR-U", R1-1910816, 3GPP TSG RAN WG1 Meeting #98bis, Chongqing, China, Oct. 14-20, 2019, 18 pages.

U.S. Appl. No. 17/075,477.

\* cited by examiner

METHOD AND APPARATUS FOR CORESET CONFIGURATION OF UNLICENSED BANDS

CROSS-REFERENCE TO RELATED APPLICATIONS AND CLAIM OF PRIORITY

This application is a continuation of U.S. patent application Ser. No. 17/075,477, filed Oct. 20, 2020, now U.S. Pat. No. 11,395,167, which claims priority to U.S. Provisional Patent Application No. 62/925,461, filed on Oct. 24, 2019; U.S. Provisional Patent Application No. 62/926,924, filed on Oct. 28, 2019; U.S. Provisional Patent Application No. 62/937,362, filed on Nov. 19, 2019; and U.S. Provisional Patent Application No. 62/957,603, filed on Jan. 6, 2020. The content of the above-identified patent document is incorporated herein by reference.

TECHNICAL FIELD

The present disclosure relates generally to wireless communication systems and, more specifically, the present disclosure relates to control resource set (CORESET) configuration on unlicensed bands.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

The present disclosure relates to wireless communication systems and, more specifically, the present disclosure relates to CORESET configuration in unlicensed band.

In one embodiment, a user equipment (UE) in a wireless communication system is provided. The UE comprises a transceiver configured to receive a synchronization signals and physical broadcast channel (SS/PBCH) block. The UE further comprises a processor operably connected to the transceiver, the processor configured to: determine a subcarrier spacing of the SS/PBCH block from a set of subcarrier spacings $\{SCS_1, SCS_2\}$, determine a subcarrier spacing of a type0 physical downlink control channel (Type0-PDCCH) common search space (CSS) set in a control resource set (CORESET), wherein the subcarrier spacing of the Type0-PDCCH CSS set is the same as the subcarrier spacing of the SS/PBCH block, determine a bandwidth of the CORESET based on master information block (MIB) in the SS/PBCH block, determine a number of symbols of the CORESET based on the MIB, determine, based on the MIB and the subcarrier spacing of the SS/PBCH block, a frequency offset from a set of frequency offsets $\{O_1, O_2\}$, wherein the frequency offset is determined as being from a smallest resource block (RB) index of the CORESET to a smallest RB index of the common RB overlapping with a first RB of the SS/PBCH block, and determine a frequency location of the CORESET based on the determined frequency offset, wherein the transceiver is further configured to receive a Type0-PDCCH based on the determined bandwidth, the number of symbols, and the frequency location of the CORESET.

In another embodiment, a base station (BS) in a wireless communication system is provided. The BS comprises a transceiver configured to: transmit a synchronization signals and physical broadcast channel (SS/PBCH) block; and transmit a type0 physical downlink control channel (Type0-PDCCH) based on a bandwidth, a number of symbols, and a frequency location of a control resource set (CORESET), wherein: the bandwidth of the CORESET is determined based on master information block (MIB) in the SS/PBCH block; the number of symbols of the CORESET is determined based on the MIB; the frequency location of the CORESET is determined based on a frequency offset that is determined from a set of frequency offsets $\{O_1, O_2\}$ based on the MIB and a subcarrier spacing of the SS/PBCH block that is determined from a set of subcarrier spacings $\{SCS_1, SCS_2\}$, the frequency offset being determined as being from a smallest resource block (RB) index of the CORESET to a smallest RB index of the common RB overlapping with a first RB of the SS/PBCH block; and a subcarrier spacing of the Type0-PDCCH common search space (CSS) set in the CORESET is configured as to the same as the subcarrier spacing of the SS/PBCH block.

In yet another embodiment, a method of a user equipment (UE) in a wireless communication system is provided. The method comprises: receiving a synchronization signals and physical broadcast channel (SS/PBCH) block; determining a subcarrier spacing of the SS/PBCH block from a set of subcarrier spacings $\{SCS_1, SCS_2\}$; determining a subcarrier spacing of a type0 physical downlink control channel (Type0-PDCCH) common search space (CSS) set in a control resource set (CORESET), wherein the subcarrier spacing of the Type0-PDCCH CSS set is the same as the subcarrier spacing of the SS/PBCH block; determining a bandwidth of the CORESET based on master information block (MIB) in the SS/PBCH block; determining a number of symbols of the CORESET based on the MIB; determining, based on the MIB and the subcarrier spacing of the SS/PBCH block, a frequency offset from a set of frequency offsets $\{O_1, O_2\}$, wherein the frequency offset is determined as being from a smallest resource block (RB) index of the CORESET to a smallest RB index of the common RB overlapping with a first RB of the SS/PBCH block; determining a frequency location of the CORESET based on the determined frequency offset; and receiving a Type0-PDCCH based on the determined bandwidth, the number of symbols, and the frequency location of the CORESET.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.4.0, "NR; Physical channels and modulation"; 3GPP TS 38.212 v15.4.0, "NR; Multiplexing and Channel coding"; 3GPP TS 38.213 v15.4.0, "NR; Physical Layer Procedures for Control"; 3GPP TS 38.214 v15.4.0, "NR; Physical Layer Procedures for Data"; and 3GPP TS 38.331 v15.4.0, "NR; Radio Resource Control (RRC) Protocol Specification."

Figure 1:
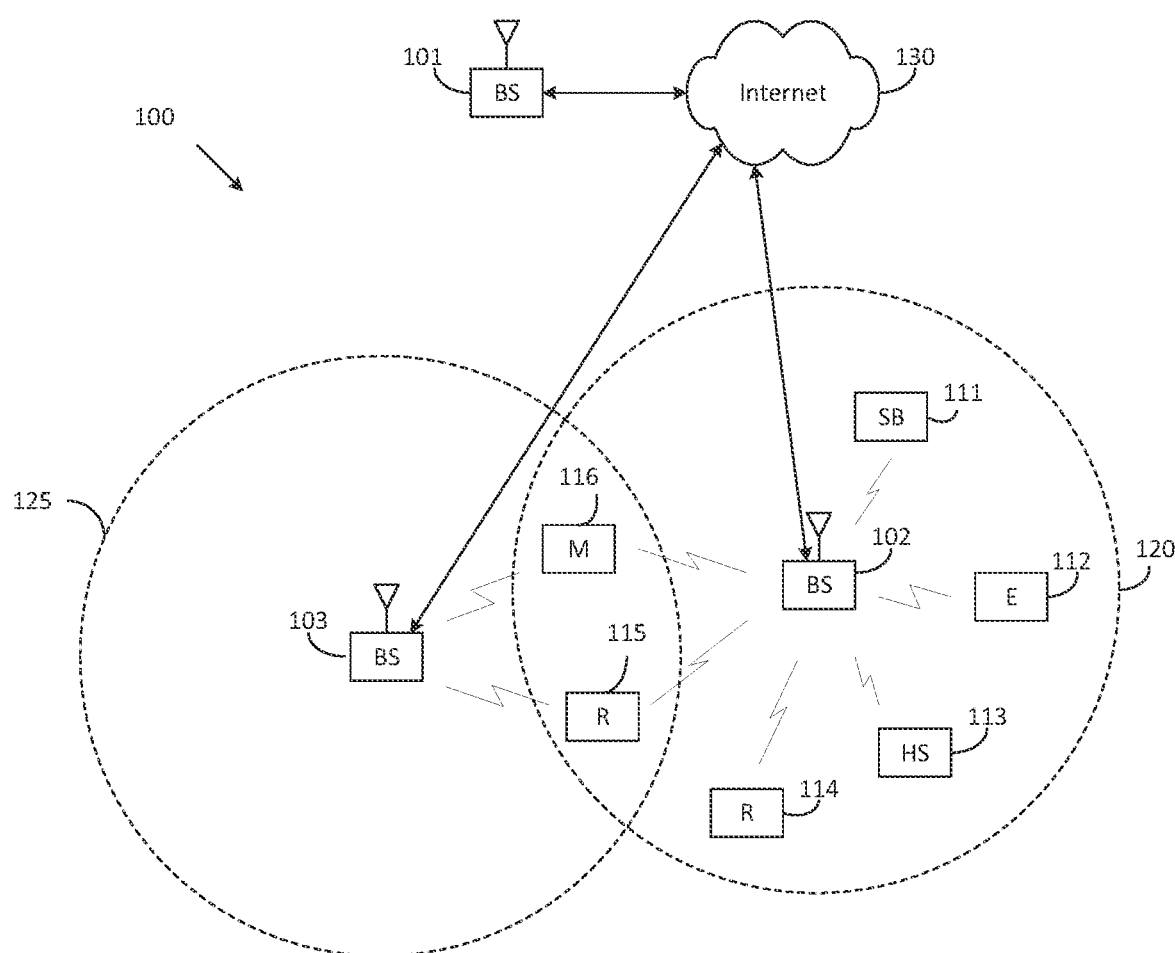
FIG. 1 illustrates an example wireless network according to embodiments of the present disclosure.
Figure 2:
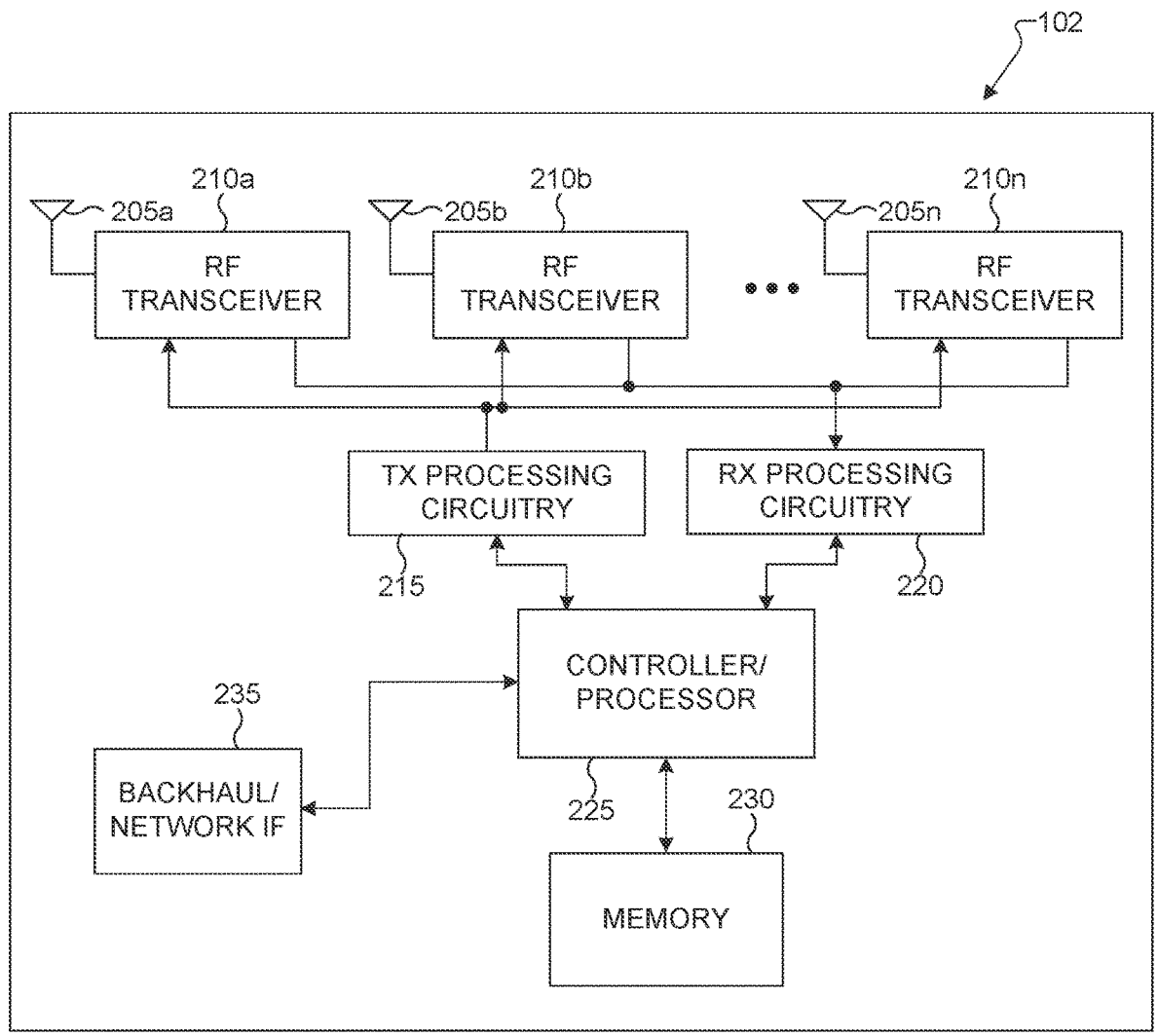
FIG. 2 illustrates an example gNB according to embodiments of the present disclosure.
Figure 3:
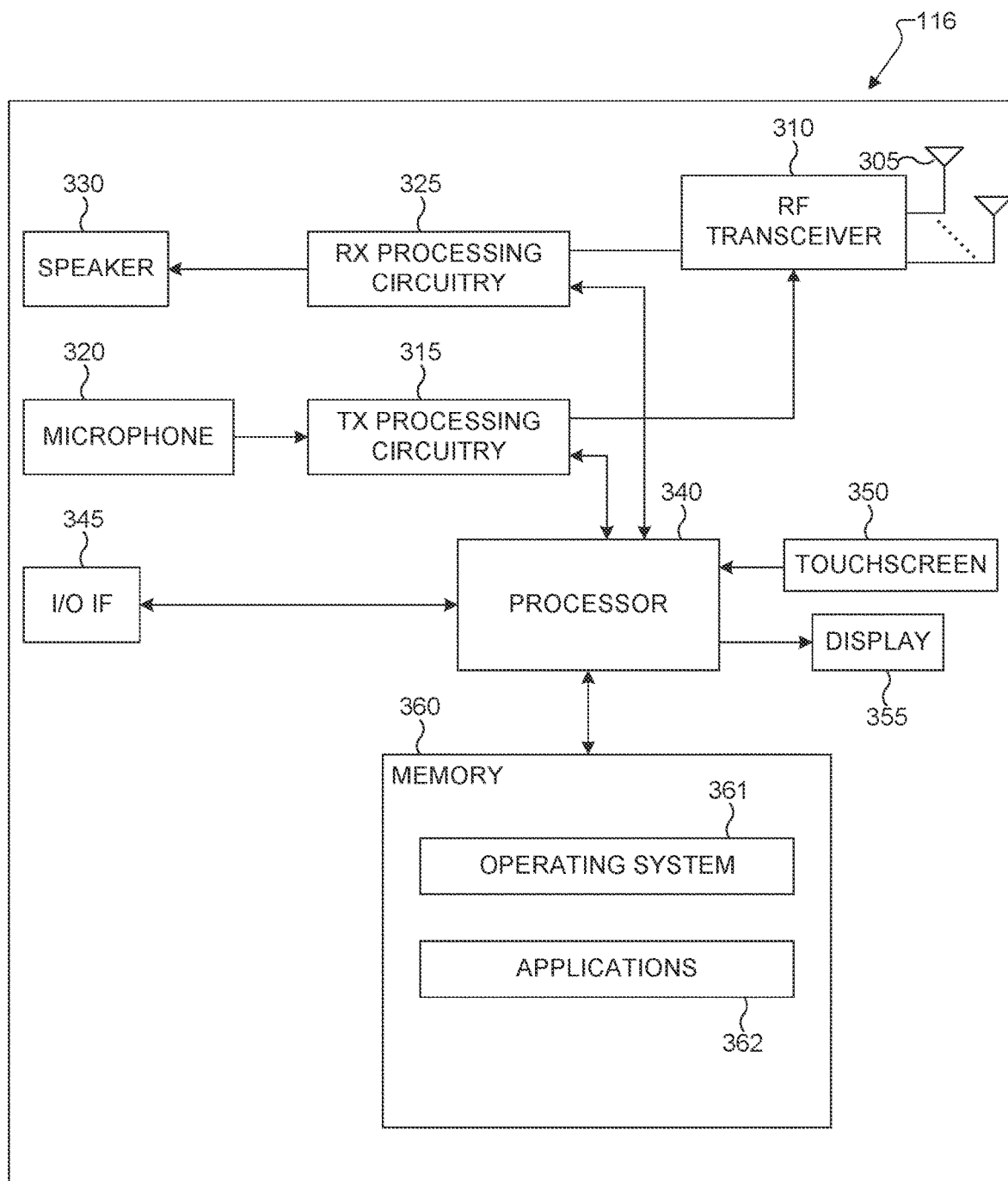
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient CORESET configuration for UEs. In certain embodiments, and one or more of the gNBs 101-103 includes circuitry, programming, or a combination thereof, for efficient CORESET configuration for UEs.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication systems, 6G or even later releases which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a PUSCH transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
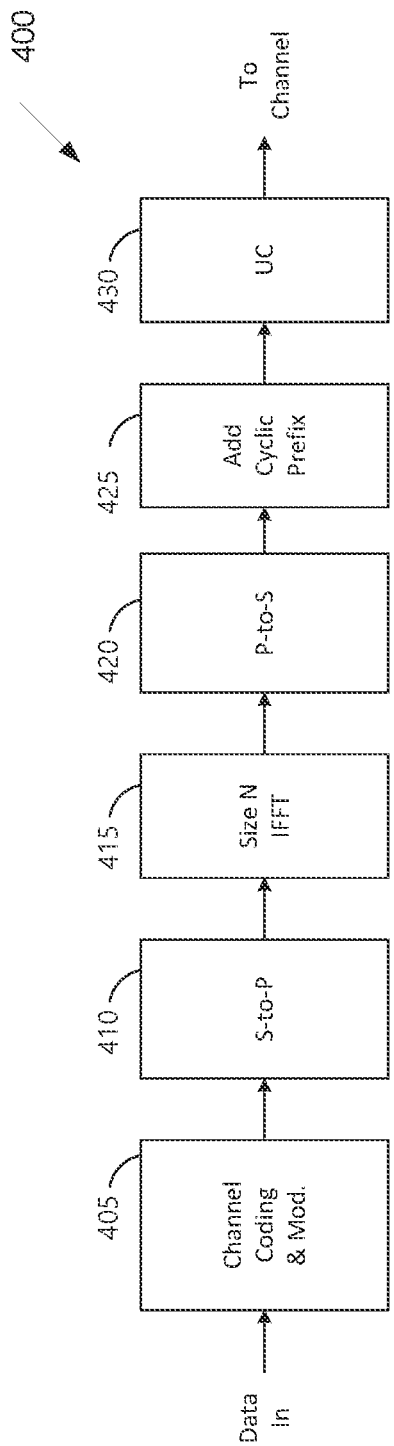
FIG. 4 illustrates an example DL slot structure according to embodiments of the present disclosure.
Figure 5:
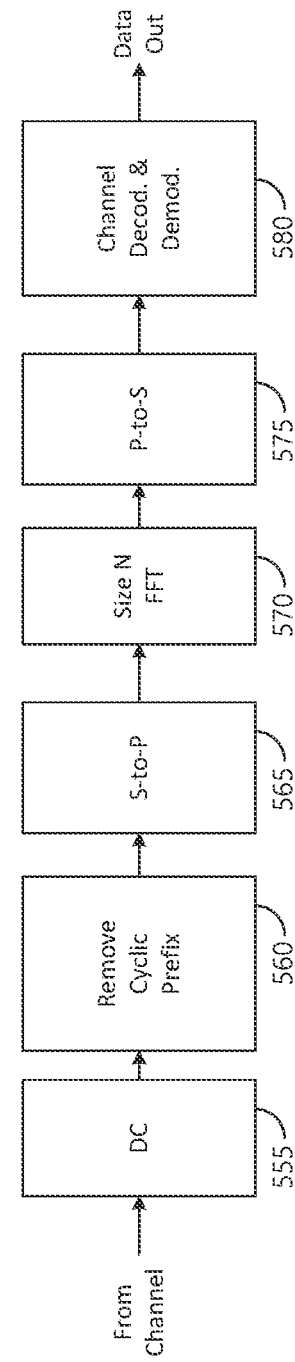
FIG. 5 illustrates an example UL slot structure for PUSCH transmission or PUCCH transmission according to embodiments of the present disclosure.

FIG. 4 and FIG. 5 illustrate example wireless transmit and receive paths according to this disclosure. In the following description, a transmit path 400 may be described as being implemented in an gNB (such as gNB 102), while a receive path 500 may be described as being implemented in a UE (such as UE 116). However, it may be understood that the receive path 500 can be implemented in an gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to gNBs 101-103 and may implement the receive path 500 for receiving in the downlink from gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure provides the mechanism and methodology to enable determining the offset between SS/PBCH block (SSB) and CORESET #0 for an unlicensed band, wherein CORESET #0 is the control resource set for type0 PDCCH. The present disclosure includes the following components: frequency domain offset for CORESET #0, sub-RB-level offset indication; and CORESET #0 configuration.

The present disclosure provides the configuration of CORESET #0 (including the frequency domain offset) for unlicensed band (e.g., operation with shared spectrum channel access), taking into consideration of different character of synchronization raster and channel raster design difference between licensed band and unlicensed band, wherein the configuration of CORESET #0 can be included in the MIB of an SSB.

In one embodiment, the frequency domain offset between SS/PBCH block (e.g., SSB) and CORESET #0 is defined as the difference between the lowest RE of SS/PBCH block and the lowest RE of the associated CORESET #0, wherein the offset includes a RB-level offset (e.g., with respect to the subcarrier spacing (SCS) of CORESET #0) and a sub-RB-level offset (e.g., with respect to the SCS of 15 kHz for FR1). In one example, the sub-RB-level offset also defines the offset between lowest RE of SSB and the common resource grid.

In one example, the channel raster for a given carrier bandwidth is fixed, in unlicensed band. In another example, the synchronization raster within a nominal carrier bandwidth (e.g., 20 MHz) is fixed.

In one example, the frequency offset between the SSB and CORESET #0, when the CORESET #0 is located at the lowest edge of the channel, can be calculated based on the fixed synchronization raster and fixed channel raster, for a given carrier bandwidth and a given combination of SCS of SSB and CORESET #0.

In one example, RB-level offset can be given by $\Delta F\_RB=\text{floor}(\Delta F/(SCS\_CORESET*N\_SC))$; and sub-RB-level offset can be given by $\Delta F\_subRB=(\Delta F-(SCS\_CORESET*N\_SC)*\Delta F\_RB)/SCS\_ref$; wherein $\Delta F=(F\_sync-N\_SSB/2*SCS\_SSB*N\_SC)-(F\_channel-N\_carrier/2*SCS\_CORESET*N\_SC)$, and F_sync is the frequency of synchronization raster entry, F_channel is the frequency of channel raster entry, N_SSB is the number of RBs for SSB bandwidth (e.g., 20 RB), N_carrier is the number of RBs for carrier bandwidth, SCS_SSB is the subcarrier spacing of SSB, SCS_CORESET is the subcarrier spacing of CORESET #0, N_SC is the number of subcarriers in a RB (e.g., 12), SCC_ref is the reference subcarrier spacing for defining the common resource grid (e.g., 15 kHz for FR1).

Example offsets are given by TABLE 1-1, for 20 MHz channel and {SCS_SSB, SCS_CORESET} {30 kHz, 30 kHz}.

TABLE 1-1

Example offsets for 20 MHz channel and {SCS_SSB, SCS_CORESET} = {30 kHz, 30 kHz}

| index | synchronization raster (GSCN) | F_sync (MHz) | lowest RE of SSB (MHz) | Nominal channel center (MHz) | F_channel (MHz) | lowest RE of channel (MHz) | RB-level offset | Sub-RB-level offset |
|---|---|---|---|---|---|---|---|---|
| 1 | 8996 | 5155.68 | 5152.08 | 5160 | 5160 | 5150.82 | 3 | 12 |
| 2 | 9010 | 5175.84 | 5172.24 | 5180 | 5179.98 | 5170.8 | 4 | 0 |
| 3 | 9024 | 5196 | 5192.4 | 5200 | 5200.02 | 5190.84 | 4 | 8 |
| 4 | 9037 or 9038 | 5214.72 or 5216.16 | 5211.12 or 5212.56 | 5220 | 5220 | 5210.82 | 0 or 4 | 20 or 20 |
| 5 | 9051 | 5234.88 | 5231.28 | 5240 | 5239.98 | 5230.8 | 1 | 8 |
| 6 | 9065 | 5255.04 | 5251.44 | 5260 | 5260.02 | 5250.84 | 1 | 16 |
| 7 | 9079 | 5275.2 | 5271.6 | 5280 | 5280 | 5270.82 | 2 | 4 |
| 8 | 9093 | 5295.36 | 5291.76 | 5300 | 5299.98 | 5290.8 | 2 | 16 |
| 9 | 9107 | 5315.52 | 5311.92 | 5320 | 5320.02 | 5310.84 | 3 | 0 |
| 10 | 9121 | 5335.68 | 5332.08 | 5340 | 5340 | 5330.82 | 3 | 12 |
| 11 | 9218 | 5475.36 | 5471.76 | 5480 | 5479.98 | 5470.8 | 2 | 16 |
| 12 | 9232 | 5495.52 | 5491.92 | 5500 | 5500.02 | 5490.84 | 3 | 0 |
| 13 | 9246 | 5515.68 | 5512.08 | 5520 | 5520 | 5510.82 | 3 | 12 |
| 14 | 9260 | 5535.84 | 5532.24 | 5540 | 5539.98 | 5530.8 | 4 | 0 |
| 15 | 9274 | 5556 | 5552.4 | 5560 | 5560.02 | 5550.84 | 4 | 8 |
| 16 | 9287 | 5574.72 | 5571.12 | 5580 | 5580 | 5570.82 | 0 | 20 |
| 17 | 9301 | 5594.88 | 5591.28 | 5600 | 5599.98 | 5590.8 | 1 | 8 |
| 18 | 9315 | 5615.04 | 5611.44 | 5620 | 5620.02 | 5610.84 | 1 | 16 |
| 19 | 9329 | 5635.2 | 5631.6 | 5640 | 5640 | 5630.82 | 2 | 4 |
| 20 | 9343 | 5655.36 | 5651.76 | 5660 | 5659.98 | 5650.8 | 2 | 16 |
| 21 | 9357 | 5675.52 | 5671.92 | 5680 | 5680.02 | 5670.84 | 3 | 0 |
| 22 | 9371 | 5695.68 | 5692.08 | 5700 | 5700 | 5690.82 | 3 | 12 |
| 23 | 9385 | 5715.84 | 5712.24 | 5720 | 5719.98 | 5710.8 | 4 | 0 |
| 24 | 9402 | 5740.32 | 5736.72 | 5745 | 5745 | 5735.82 | 2 | 12 |
| 25 | 9416 | 5760.48 | 5756.88 | 5765 | 5764.98 | 5755.8 | 3 | 0 |
| 26 | 9430 | 5780.64 | 5777.04 | 5785 | 5785.02 | 5775.84 | 3 | 8 |
| 27 | 9444 | 5800.8 | 5797.2 | 5805 | 5805 | 5795.82 | 3 | 20 |
| 28 | 9458 | 5820.96 | 5817.36 | 5825 | 5824.98 | 5815.8 | 4 | 8 |
| 29 | 9471 | 5839.68 | 5836.08 | 5845 | 5845.02 | 5835.84 | 0 | 16 |
| 30 | 9485 | 5859.84 | 5856.24 | 5865 | 5865 | 5855.82 | 1 | 4 |
| 31 | 9499 | 5880 | 5876.4 | 5885 | 5884.98 | 5875.8 | 1 | 16 |
| 32 | 9513 | 5900.16 | 5896.56 | 5905 | 5905.02 | 5895.84 | 2 | 0 |

Example offsets are given by TABLE 1-2, for 40 MHz channel and {SCS_SSB, SCS_CORESET}={30 kHz, 30 kHz}.

TABLE 1-2

Example offsets for 40 MHz channel and {SCS_SSB, SCS_CORESET} = {30 kHz, 30 kHz}

| index | synchronization raster (GSCN) | F_sync (MHz) | lowest RE of SSB (MHz) | Nominal channel center (MHz) | F_channel (MHz) | lowest RE of channel (MHz) | RB-level offset | Sub-RB-level offset |
|---|---|---|---|---|---|---|---|---|
| 1 | 8996 | 5155.68 | 5152.08 | 5170 | 5170.02 | 5150.94 | 3 | 4 |
| 2 | 9010 | 5175.84 | 5172.24 | 5190 | 5190 | 5170.92 | 3 | 16 |
| 3 | 9024 | 5196 | 5192.4 | | | | | |
| 4 | 9037 or 9038 | 5214.72 or 5216.16 | 5211.12 or 5212.56 | 5230 | 5230.02 | 5210.94 | 0 or 4 | 12 or 12 |
| 5 | 9051 | 5234.88 | 5231.28 | | | | | |
| 6 | 9065 | 5255.04 | 5251.44 | 5270 | 5269.98 | 5250.9 | 1 | 12 |
| 7 | 9079 | 5275.2 | 5271.6 | | | | | |
| 8 | 9093 | 5295.36 | 5291.76 | 5310 | 5310 | 5290.92 | 2 | 8 |
| 9 | 9107 | 5315.52 | 5311.92 | 5330 | 5329.98 | 5310.9 | 2 | 20 |
| 10 | 9121 | 5335.68 | 5332.08 | | | | | |
| 11 | 9218 | 5475.36 | 5471.76 | 5490 | 5490 | 5470.92 | 2 | 8 |
| 12 | 9232 | 5495.52 | 5491.92 | 5510 | 5509.98 | 5490.9 | 2 | 20 |
| 13 | 9246 | 5515.68 | 5512.08 | | | | | |
| 14 | 9260 | 5535.84 | 5532.24 | 5550 | 5550 | 5530.92 | 3 | 16 |
| 15 | 9274 | 5556 | 5552.4 | | | | | |
| 16 | 9287 | 5574.72 | 5571.12 | 5590 | 5590.02 | 5570.94 | 0 | 12 |
| 17 | 9301 | 5594.88 | 5591.28 | | | | | |
| 18 | 9315 | 5615.04 | 5611.44 | 5630 | 5629.98 | 5610.9 | 1 | 12 |
| 19 | 9329 | 5635.2 | 5631.6 | | | | | |
| 20 | 9343 | 5655.36 | 5651.76 | 5670 | 5670 | 5650.92 | 2 | 8 |
| 21 | 9357 | 5675.52 | 5671.92 | | | | | |
| 22 | 9371 | 5695.68 | 5692.08 | 5710 | 5710.02 | 5690.94 | 3 | 4 |
| 23 | 9385 | 5715.84 | 5712.24 | | | | | |
| 24 | 9402 | 5740.32 | 5736.72 | 5755 | 5755.02 | 5735.94 | 2 | 4 |
| 25 | 9416 | 5760.48 | 5756.88 | | | | | |
| 26 | 9430 | 5780.64 | 5777.04 | 5795 | 5794.98 | 5775.9 | 3 | 4 |
| 27 | 9444 | 5800.8 | 5797.2 | 5815 | 5815.02 | 5795.94 | 3 | 12 |
| 28 | 9458 | 5820.96 | 5817.36 | 5835 | 5835 | 5815.92 | 4 | 0 |
| 29 | 9471 | 5839.68 | 5836.08 | | | | | |
| 30 | 9485 | 5859.84 | 5856.24 | 5875 | 5875.02 | 5855.94 | 0 | 20 |
| 31 | 9499 | 5880 | 5876.4 | | | | | |
| 32 | 9513 | 5900.16 | 5896.56 | | | | | |

Example offsets are given by TABLE 1-3, for 60 MHz channel and {SCS_SSB, SCS_CORESET}={30 kHz, 30 kHz}.

TABLE 1-3

Example offsets for 60 MHz channel and {SCS_SSB, SCS_CORESET} = {30 kHz, 30 kHz}

| index | synchronization raster (GSCN) | F_sync (MHz) | lowest RE of SSB (MHz) | Nominal channel center (MHz) | F_channel (MHz) | lowest RE of channel (MHz) | RB-level offset | Sub-RB-level offset |
|---|---|---|---|---|---|---|---|---|
| 1 | 8996 | 5155.68 | 5152.08 | 5180 | 5179.98 | 5150.82 | 3 | 12 |
| 2 | 9010 | 5175.84 | 5172.24 | 5200 | 5200.02 | 5170.86 | 3 | 20 |
| 3 | 9024 | 5196 | 5192.4 | 5220 | 5220 | 5190.84 | 4 | 8 |
| 4 | 9037 or 9038 | 5214.72 or 5216.16 | 5211.12 or 5212.56 | | | | | |
| 5 | 9051 | 5234.88 | 5231.28 | | | | | |
| 6 | 9065 | 5255.04 | 5251.44 | 5280 | 5280 | 5250.84 | 1 | 16 |
| 7 | 9079 | 5275.2 | 5271.6 | 5300 | 5299.98 | 5270.82 | 2 | 4 |
| 8 | 9093 | 5295.36 | 5291.76 | 5320 | 5320.02 | 5290.86 | 2 | 12 |
| 9 | 9107 | 5315.52 | 5311.92 | | | | | |
| 10 | 9121 | 5335.68 | 5332.08 | | | | | |
| 11 | 9218 | 5475.36 | 5471.76 | 5500 | 5500.02 | 5470.86 | 2 | 12 |
| 12 | 9232 | 5495.52 | 5491.92 | 5520 | 5520 | 5490.84 | 3 | 0 |
| 13 | 9246 | 5515.68 | 5512.08 | 5540 | 5539.98 | 5510.82 | 3 | 12 |
| 14 | 9260 | 5535.84 | 5532.24 | | | | | |

TABLE 1-3-continued

Example offsets for 60 MHz channel and {SCS_SSB, SCS_CORESET} = {30 kHz, 30 kHz}

| index | synchronization raster (GSCN) | F_sync (MHz) | lowest RE of SSB (MHz) | Nominal channel center (MHz) | F_channel (MHz) | lowest RE of channel (MHz) | RB-level offset | Sub-RB-level offset |
|---|---|---|---|---|---|---|---|---|
| 15 | 9274 | 5556 | 5552.4 | 5580 | 5580 | 5550.84 | 4 | 8 |
| 16 | 9287 | 5574.72 | 5571.12 | 5600 | 5599.98 | 5570.82 | 0 | 20 |
| 17 | 9301 | 5594.88 | 5591.28 | 5620 | 5620.02 | 5590.86 | 1 | 4 |
| 18 | 9315 | 5615.04 | 5611.44 | | | | | |
| 19 | 9329 | 5635.2 | 5631.6 | | | | | |
| 20 | 9343 | 5655.36 | 5651.76 | 5680 | 5680.02 | 5650.86 | 2 | 12 |
| 21 | 9357 | 5675.52 | 5671.92 | 5700 | 5700 | 5670.84 | 3 | 0 |
| 22 | 9371 | 5695.68 | 5692.08 | | | | | |
| 23 | 9385 | 5715.84 | 5712.24 | | | | | |
| 24 | 9402 | 5740.32 | 5736.72 | 5765 | 5764.98 | 5735.82 | 2 | 12 |
| 25 | 9416 | 5760.48 | 5756.88 | 5785 | 5785.02 | 5755.86 | 2 | 20 |
| 26 | 9430 | 5780.64 | 5777.04 | 5805 | 5805 | 5775.84 | 3 | 8 |
| 27 | 9444 | 5800.8 | 5797.2 | | | | | |
| 28 | 9458 | 5820.96 | 5817.36 | | | | | |
| 29 | 9471 | 5839.68 | 5836.08 | | | | | |
| 30 | 9485 | 5859.84 | 5856.24 | | | | | |
| 31 | 9499 | 5880 | 5876.4 | | | | | |
| 32 | 9513 | 5900.16 | 5896.56 | | | | | |

Example offsets are given by TABLE 1-4, for 80 MHz channel and {SCS_SSB, SCS_CORESET}={30 kHz, 30 kHz}.

Example offsets are given by TABLE 1-5, for 20 MHz channel and {SCS_SSB, SCS_CORESET} {15 kHz, 15 kHz}.

TABLE 1-4

Example offsets for 80 MHz channel and {SCS_SSB, SCS_CORESET} = {30 kHz, 30 kHz}

| index | synchronization raster (GSCN) | F_sync (MHz) | lowest RE of SSB (MHz) | Nominal channel center (MHz) | F_channel (MHz) | lowest RE of channel (MHz) | RB-level offset | Sub-RB-level offset |
|---|---|---|---|---|---|---|---|---|
| 1 | 8996 | 5155.68 | 5152.08 | 5190 | 5190 | 5150.94 | 3 | 4 |
| 2 | 9010 | 5175.84 | 5172.24 | 5210 | 5209.98 | 5170.92 | 3 | 16 |
| 3 | 9024 | 5196 | 5192.4 | | | | | |
| 4 | 9037 or 9038 | 5214.72 or 5216.16 | 5211.12 or 5212.56 | | | | | |
| 5 | 9051 | 5234.88 | 5231.28 | | | | | |
| 6 | 9065 | 5255.04 | 5251.44 | 5290 | 5290.02 | 5250.96 | 1 | 8 |
| 7 | 9079 | 5275.2 | 5271.6 | | | | | |
| 8 | 9093 | 5295.36 | 5291.76 | | | | | |
| 9 | 9107 | 5315.52 | 5311.92 | | | | | |
| 10 | 9121 | 5335.68 | 5332.08 | | | | | |
| 11 | 9218 | 5475.36 | 5471.76 | | | | | |
| 12 | 9232 | 5495.52 | 5491.92 | 5530 | 5530.02 | 5490.96 | 2 | 16 |
| 13 | 9246 | 5515.68 | 5512.08 | | | | | |
| 14 | 9260 | 5535.84 | 5532.24 | | | | | |
| 15 | 9274 | 5556 | 5552.4 | | | | | |
| 16 | 9287 | 5574.72 | 5571.12 | 5610 | 5610 | 5570.94 | 0 | 12 |
| 17 | 9301 | 5594.88 | 5591.28 | | | | | |
| 18 | 9315 | 5615.04 | 5611.44 | | | | | |
| 19 | 9329 | 5635.2 | 5631.6 | | | | | |
| 20 | 9343 | 5655.36 | 5651.76 | 5690 | 5689.98 | 5650.92 | 2 | 8 |
| 21 | 9357 | 5675.52 | 5671.92 | | | | | |
| 22 | 9371 | 5695.68 | 5692.08 | | | | | |
| 23 | 9385 | 5715.84 | 5712.24 | | | | | |
| 24 | 9402 | 5740.32 | 5736.72 | 5775 | 5775 | 5735.94 | 2 | 4 |
| 25 | 9416 | 5760.48 | 5756.88 | 5795 | 5794.98 | 5755.92 | 2 | 16 |
| 26 | 9430 | 5780.64 | 5777.04 | | | | | |
| 27 | 9444 | 5800.8 | 5797.2 | | | | | |
| 28 | 9458 | 5820.96 | 5817.36 | 5855 | 5854.98 | 5815.92 | 4 | 0 |
| 29 | 9471 | 5839.68 | 5836.08 | | | | | |
| 30 | 9485 | 5859.84 | 5856.24 | | | | | |
| 31 | 9499 | 5880 | 5876.4 | | | | | |
| 32 | 9513 | 5900.16 | 5896.56 | | | | | |

TABLE 1-5

Example offsets for 20 MHz channel and {SCS_SSB, SCS_CORESET} = {15 kHz, 15 kHz}

| index | synchronization raster (GSCN) | F_sync (MHz) | lowest RE of SSB (MHz) | Nominal channel center (MHz) | F_channel (MHz) | lowest RE of channel (MHz) | RB-level offset | Sub-RB-level offset |
|---|---|---|---|---|---|---|---|---|
| 1 | 8996 | 5155.68 | 5153.88 | 5160 | 5160 | 5150.46 | 19 | 0 |
| 2 | 9010 | 5175.84 | 5174.04 | 5180 | 5179.98 | 5170.44 | 20 | 0 |
| 3 | 9024 | 5196 | 5194.2 | 5200 | 5200.02 | 5190.48 | 20 | 8 |
| 4 | 9037 or 9038 | 5214.72 or 5216.16 | 5211.12 or 5214.36 | 5220 | 5220 | 5210.46 | 13 or 21 | 8 or 8 |
| 5 | 9051 | 5234.88 | 5233.08 | 5240 | 5239.98 | 5230.44 | 14 | 8 |
| 6 | 9065 | 5255.04 | 5253.24 | 5260 | 5260.02 | 5250.48 | 15 | 4 |
| 7 | 9079 | 5275.2 | 5273.4 | 5280 | 5280 | 5270.46 | 16 | 4 |
| 8 | 9093 | 5295.36 | 5293.56 | 5300 | 5299.98 | 5290.44 | 17 | 4 |
| 9 | 9107 | 5315.52 | 5313.72 | 5320 | 5320.02 | 5310.48 | 18 | 0 |
| 10 | 9121 | 5335.68 | 5333.88 | 5340 | 5340 | 5330.46 | 19 | 0 |
| 11 | 9218 | 5475.36 | 5473.56 | 5480 | 5479.98 | 5470.44 | 17 | 4 |
| 12 | 9232 | 5495.52 | 5493.72 | 5500 | 5500.02 | 5490.48 | 18 | 0 |
| 13 | 9246 | 5515.68 | 5513.88 | 5520 | 5520 | 5510.46 | 19 | 0 |
| 14 | 9260 | 5535.84 | 5534.04 | 5540 | 5539.98 | 5530.44 | 20 | 0 |
| 15 | 9274 | 5556 | 5554.2 | 5560 | 5560.02 | 5550.48 | 20 | 8 |
| 16 | 9287 | 5574.72 | 5572.92 | 5580 | 5580 | 5570.46 | 13 | 8 |
| 17 | 9301 | 5594.88 | 5593.08 | 5600 | 5599.98 | 5590.44 | 14 | 8 |
| 18 | 9315 | 5615.04 | 5613.24 | 5620 | 5620.02 | 5610.48 | 15 | 4 |
| 19 | 9329 | 5635.2 | 5633.4 | 5640 | 5640 | 5630.46 | 16 | 4 |
| 20 | 9343 | 5655.36 | 5653.56 | 5660 | 5659.98 | 5650.44 | 17 | 4 |
| 21 | 9357 | 5675.52 | 5673.72 | 5680 | 5680.02 | 5670.48 | 18 | 0 |
| 22 | 9371 | 5695.68 | 5693.88 | 5700 | 5700 | 5690.46 | 19 | 0 |
| 23 | 9385 | 5715.84 | 5714.04 | 5720 | 5719.98 | 5710.44 | 20 | 0 |
| 24 | 9402 | 5740.32 | 5738.52 | 5745 | 5745 | 5735.46 | 17 | 0 |
| 25 | 9416 | 5760.48 | 5758.68 | 5765 | 5764.98 | 5755.44 | 18 | 0 |
| 26 | 9430 | 5780.64 | 5778.84 | 5785 | 5785.02 | 5775.48 | 18 | 8 |
| 27 | 9444 | 5800.8 | 5799 | 5805 | 5805 | 5795.46 | 19 | 8 |
| 28 | 9458 | 5820.96 | 5819.16 | 5825 | 5824.98 | 5815.44 | 20 | 8 |
| 29 | 9471 | 5839.68 | 5837.88 | 5845 | 5845.02 | 5835.48 | 13 | 4 |
| 30 | 9485 | 5859.84 | 5858.04 | 5865 | 5865 | 5855.46 | 14 | 4 |
| 31 | 9499 | 5880 | 5878.2 | 5885 | 5884.98 | 5875.44 | 15 | 4 |
| 32 | 9513 | 5900.16 | 5898.36 | 5905 | 5905.02 | 5895.48 | 16 | 0 |

Example offsets are given by TABLE 1-6, for 40 MHz channel and {SCS_SSB, SCS_CORESET}={15 kHz, 15 kHz}.

TABLE 1-6

Example offsets for 40 MHz channel and {SCS_SSB, SCS_CORESET} = {15 kHz, 15 kHz}

| index | synchronization raster (GSCN) | F_sync (MHz) | lowest RE of SSB (MHz) | Nominal channel center (MHz) | F_channel (MHz) | lowest RE of channel (MHz) | RB-level offset | Sub-RB-level offset |
|---|---|---|---|---|---|---|---|---|
| 1 | 8996 | 5155.68 | 5153.88 | 5170 | 5170.02 | 5150.58 | 18 | 4 |
| 2 | 9010 | 5175.84 | 5174.04 | 5190 | 5190 | 5170.56 | 19 | 4 |
| 3 | 9024 | 5196 | 5194.2 | | | | | |
| 4 | 9037 or 9038 | 5214.72 or 5216.16 | 5211.12 or 5214.36 | 5230 | 5230.02 | 5210.58 | 13 or 21 | 0 or 0 |
| 5 | 9051 | 5234.88 | 5233.08 | | | | | |
| 6 | 9065 | 5255.04 | 5253.24 | 5270 | 5269.98 | 5250.54 | 15 | 0 |
| 7 | 9079 | 5275.2 | 5273.4 | | | | | |
| 8 | 9093 | 5295.36 | 5293.56 | 5310 | 5310 | 5290.56 | 16 | 8 |
| 9 | 9107 | 5315.52 | 5313.72 | 5330 | 5329.98 | 5310.54 | 17 | 8 |
| 10 | 9121 | 5335.68 | 5333.88 | | | | | |
| 11 | 9218 | 5475.36 | 5473.56 | 5490 | 5490 | 5470.56 | 16 | 8 |
| 12 | 9232 | 5495.52 | 5493.72 | 5510 | 5509.98 | 5490.54 | 17 | 8 |
| 13 | 9246 | 5515.68 | 5513.88 | | | | | |
| 14 | 9260 | 5535.84 | 5534.04 | 5550 | 5550 | 5530.56 | 19 | 4 |
| 15 | 9274 | 5556 | 5554.2 | | | | | |
| 16 | 9287 | 5574.72 | 5572.92 | 5590 | 5590.02 | 5570.58 | 13 | 0 |
| 17 | 9301 | 5594.88 | 5593.08 | | | | | |
| 18 | 9315 | 5615.04 | 5613.24 | 5630 | 5629.98 | 5610.54 | 15 | 0 |

TABLE 1-6-continued

Example offsets for 40 MHz channel and {SCS_SSB, SCS_CORESET} = {15 kHz, 15 kHz}

| index | synchronization raster (GSCN) | F_sync (MHz) | lowest RE of SSB (MHz) | Nominal channel center (MHz) | F_channel (MHz) | lowest RE of channel (MHz) | RB-level offset | Sub-RB-level offset |
|---|---|---|---|---|---|---|---|---|
| 19 | 9329 | 5635.2 | 5633.4 | | | | | |
| 20 | 9343 | 5655.36 | 5653.56 | 5670 | 5670 | 5650.56 | 16 | 8 |
| 21 | 9357 | 5675.52 | 5673.72 | | | | | |
| 22 | 9371 | 5695.68 | 5693.88 | 5710 | 5710.02 | 5690.58 | 18 | 4 |
| 23 | 9385 | 5715.84 | 5714.04 | | | | | |
| 24 | 9402 | 5740.32 | 5738.52 | 5755 | 5755.02 | 5735.58 | 16 | 4 |
| 25 | 9416 | 5760.48 | 5758.68 | | | | | |
| 26 | 9430 | 5780.64 | 5778.84 | 5795 | 5794.98 | 5775.54 | 18 | 4 |
| 27 | 9444 | 5800.8 | 5799 | 5815 | 5815.02 | 5795.58 | 19 | 0 |
| 28 | 9458 | 5820.96 | 5819.16 | 5835 | 5835 | 5815.56 | 20 | 0 |
| 29 | 9471 | 5839.68 | 5837.88 | | | | | |
| 30 | 9485 | 5859.84 | 5858.04 | 5875 | 5875.02 | 5855.58 | 13 | 8 |
| 31 | 9499 | 5880 | 5878.2 | | | | | |
| 32 | 9513 | 5900.16 | 5898.36 | | | | | |

In another example, the frequency offset between the SSB and CORESET #0, when the CORESET #0 is located at the highest edge of the channel, can be calculated based on the fixed synchronization raster and fixed channel raster, for a given carrier bandwidth and a given combination of SCS of SSB and CORESET #0.

In one example, RB-level offset can be given by $\Delta F\_RB = N\_CORESET - \text{ceiling}(\Delta F/(SCS\_CORESET*N\_SC)) - N\_SSB$; and sub-RB-level offset can be given by $\Delta F\_subRB = (N\_CORESET + (SCS\_CORESET*N\_SC)*\Delta F\_RB + N\_SSB - \Delta F)/SCS\_ref$; wherein $\Delta F = (F\_channel + N\_carrier/2*SCS\_CORESET*N\_SC) - (F\_sync + N\_SSB/2*SCS\_SSB*N\_SC)$, and F_sync is the frequency of synchronization raster entry, F_channel is the frequency of channel raster entry, N_SSB is the number of RBs for SSB bandwidth (e.g., 20 RB), N_carrier is the number of RBs for carrier bandwidth, N_CORESET is the number of RBs for CORESET #0, SCS_SSB is the subcarrier spacing of SSB, SCS_CORESET is the subcarrier spacing of CORESET #0, N_SC is the number of subcarriers in a RB (e.g., 12), SCC_ref is the reference subcarrier spacing for defining the common resource grid (e.g., 15 kHz for FR1).

A summary of the RB-level offset and RE-level offset for channels with all supported bandwidth is shown in TABLE 2-1 to TABLE 2-4.

TABLE 2-1

Example offsets for 20 MHz channel.

| Channel index | Nominal channel center (MHz) | Channel raster (MHz) | Sync raster (GSCN) | RB-level offset for 30 kHz SCS | Sub-RB-level offset for 30 kHz SCS | RB-level offset for 15 kHz SCS | Sub-RB-level offset for 15 kHz SCS |
|---|---|---|---|---|---|---|---|
| 1 | 5160 | 5160.00 | 8996 | 3 | 12 | 19 | 0 |
| 2 | 5180 | 5179.98 | 9010 | 4 | 0 | 20 | 0 |
| 3 | 5200 | 5200.02 | 9024 | 4 | 8 | 20 | 8 |
| 4 | 5220 | 5220.00 | 9037 or 9038 | 0 or 4 | 20 or 20 | 13 or 21 | 8 or 8 |
| 5 | 5240 | 5239.98 | 9051 | 1 | 8 | 14 | 8 |
| 6 | 5260 | 5260.02 | 9065 | 1 | 16 | 15 | 4 |
| 7 | 5280 | 5280.00 | 9079 | 2 | 4 | 16 | 4 |
| 8 | 5300 | 5299.98 | 9093 | 2 | 16 | 17 | 4 |
| 9 | 5320 | 5320.02 | 9107 | 3 | 0 | 18 | 0 |
| 10 | 5340 | 5340.00 | 9121 | 3 | 12 | 19 | 0 |
| 11 | 5480 | 5479.98 | 9218 | 2 | 16 | 17 | 4 |
| 12 | 5500 | 5500.02 | 9232 | 3 | 0 | 18 | 0 |
| 13 | 5520 | 5520.00 | 9246 | 3 | 12 | 19 | 0 |
| 14 | 5540 | 5539.98 | 9260 | 4 | 0 | 20 | 0 |
| 15 | 5560 | 5560.02 | 9274 | 4 | 8 | 20 | 8 |
| 16 | 5580 | 5580.00 | 9287 | 0 | 20 | 13 | 8 |
| 17 | 5600 | 5599.98 | 9301 | 1 | 8 | 14 | 8 |
| 18 | 5620 | 5620.02 | 9315 | 1 | 16 | 15 | 4 |
| 19 | 5640 | 5640.00 | 9329 | 2 | 4 | 16 | 4 |
| 20 | 5660 | 5659.98 | 9343 | 2 | 16 | 17 | 4 |
| 21 | 5680 | 5680.02 | 9357 | 3 | 0 | 18 | 0 |
| 22 | 5700 | 5700.00 | 9371 | 3 | 12 | 19 | 0 |
| 23 | 5720 | 5719.98 | 9385 | 4 | 0 | 20 | 0 |
| 24 | 5745 | 5745.00 | 9402 | 2 | 12 | 17 | 0 |
| 25 | 5765 | 5764.98 | 9416 | 3 | 0 | 18 | 0 |
| 26 | 5785 | 5785.02 | 9430 | 3 | 8 | 18 | 8 |
| 27 | 5805 | 5805.00 | 9444 | 3 | 20 | 19 | 8 |
| 28 | 5825 | 5824.98 | 9458 | 4 | 8 | 20 | 8 |

TABLE 2-1-continued

Example offsets for 20 MHz channel.

| Channel index | Nominal channel center (MHz) | Channel raster (MHz) | Sync raster (GSCN) | RB-level offset for 30 kHz SCS | Sub-RB-level offset for 30 kHz SCS | RB-level offset for 15 kHz SCS | Sub-RB-level offset for 15 kHz SCS |
|---|---|---|---|---|---|---|---|
| 29 | 5845 | 5845.02 | 9471 | 0 | 16 | 13 | 4 |
| 30 | 5865 | 5865.00 | 9485 | 1 | 4 | 14 | 4 |
| 31 | 5885 | 5884.98 | 9499 | 1 | 16 | 15 | 4 |
| 32 | 5905 | 5905.02 | 9513 | 2 | 0 | 16 | 0 |

TABLE 2-2

Example offsets for 40 MHz channel.

| Channel index | Nominal channel center (MHz) | Channel raster F_channel (MHz) | Sync raster (GSCN) | RB-level offset for 30 kHz SCS | Sub-RB-level offset for 30 kHz SCS | RB-level offset for 15 kHz SCS | Sub-RB-level offset for 15 kHz SCS |
|---|---|---|---|---|---|---|---|
| 1 | 5170 | 5170.02 | 8996 | 3 | 4 | 18 | 4 |
|   |      |         | 9010 | 4 |   | 20 |   |
| 2 | 5190 | 5190.00 | 9010 | 3 | 16 | 19 | 4 |
|   |      |         | 9024 | 4 |   | 21 |   |
| 3 | 5230 | 5230.02 | 9037 or 9038 | 0 or 4 | 12 | 13 | 0 |
|   |      |         | 9051 | 1 |   | 15 |   |
| 4 | 5270 | 5269.98 | 9065 | 1 | 12 | 15 | 0 |
|   |      |         | 9079 | 2 |   | 17 |   |
| 5 | 5310 | 5310.00 | 9093 | 2 | 8 | 16 | 8 |
|   |      |         | 9107 | 3 |   | 18 |   |
| 6 | 5330 | 5329.98 | 9107 | 2 | 20 | 17 | 8 |
|   |      |         | 9121 | 3 |   | 19 |   |
| 7 | 5490 | 5490.00 | 9218 | 2 | 8 | 16 | 8 |
|   |      |         | 9232 | 3 |   | 18 |   |
| 8 | 5510 | 5509.98 | 9232 | 2 | 20 | 17 | 8 |
|   |      |         | 9246 | 3 |   | 19 |   |
| 9 | 5550 | 5550.00 | 9260 | 3 | 16 | 19 | 4 |
|   |      |         | 9274 | 4 |   | 21 |   |
| 10 | 5590 | 5590.02 | 9287 | 0 | 12 | 13 | 0 |
|    |      |         | 9301 | 1 |   | 15 |   |
| 11 | 5630 | 5629.98 | 9315 | 1 | 12 | 15 | 0 |
|    |      |         | 9329 | 2 |   | 17 |   |
| 12 | 5670 | 5670.00 | 9343 | 2 | 8 | 16 | 8 |
|    |      |         | 9357 | 3 |   | 18 |   |
| 13 | 5710 | 5710.02 | 9371 | 3 | 4 | 18 | 4 |
|    |      |         | 9385 | 4 |   | 20 |   |
| 14 | 5755 | 5755.02 | 9402 | 2 | 4 | 16 | 4 |
|    |      |         | 9416 | 3 |   | 18 |   |
| 15 | 5795 | 5794.98 | 9430 | 3 | 4 | 18 | 4 |
|    |      |         | 9444 | 4 |   | 20 |   |
| 16 | 5815 | 5815.02 | 9444 | 3 | 12 | 19 | 0 |
|    |      |         | 9458 | 4 |   | 21 |   |
| 17 | 5835 | 5835.00 | 9458 | 4 | 0 | 20 | 0 |
|    |      |         | 9471 | 1 |   | 14 |   |
| 18 | 5875 | 5875.02 | 9485 | 0 | 20 | 13 | 8 |
|    |      |         | 9499 | 1 |   | 15 |   |

TABLE 2-3

Example offsets for 60 MHz channel.

| Channel index | Nominal channel center (MHz) | Channel raster F_channel (MHz) | Sync raster (GSCN) | RB-level offset for 30 kHz SCS | Sub-RB-level offset for 30 kHz SCS | RB-level offset for 15 kHz SCS | Sub-RB-level offset for 15 kHz SCS |
|---|---|---|---|---|---|---|---|
| 1 | 5180 | 5155.68 | 8996 | 3 | 12 | — | — |
|   |      |         | 9024 | 4 |    | — |   |

TABLE 2-3-continued

Example offsets for 60 MHz channel.

| Channel index | Nominal channel center (MHz) | Channel raster F_channel (MHz) | Sync raster (GSCN) | RB-level offset for 30 kHz SCS | Sub-RB-level offset for 30 kHz SCS | RB-level offset for 15 kHz SCS | Sub-RB-level offset for 15 kHz SCS |
|---|---|---|---|---|---|---|---|
| 2 | 5200 | 5175.84 | 9010 | 3 | — | — | — |
|   |      |         | 9037 or 9038 | 0 or 4 | 20 | — | — |
| 3 | 5220 | 5196.00 | 9024 | 4 | 8 | — | — |
|   |      |         | 9051 | 1 |   | — | — |
| 4 | 5280 | 5255.04 | 9065 | 1 | 16 | — | — |
|   |      |         | 9093 | 2 |   | — | — |
| 5 | 5300 | 5275.20 | 9079 | 2 | 4 | — | — |
|   |      |         | 9107 | 3 |   | — | — |
| 6 | 5320 | 5295.36 | 9093 | 2 | 12 | — | — |
|   |      |         | 9121 | 3 |   | — | — |
| 7 | 5500 | 5475.36 | 9218 | 2 | 12 | — | — |
|   |      |         | 9246 | 3 |   | — | — |
| 8 | 5520 | 5495.52 | 9232 | 3 | 0 | — | — |
|   |      |         | 9260 | 4 |   | — | — |
| 9 | 5540 | 5515.68 | 9246 | 3 | 12 | — | — |
|   |      |         | 9274 | 4 |   | — | — |
| 10 | 5580 | 5556.00 | 9274 | 4 | 8 | — | — |
|    |      |         | 9301 | 1 |   | — | — |
| 11 | 5600 | 5574.72 | 9287 | 0 | 20 | — | — |
|    |      |         | 9315 | 1 |   | — | — |
| 12 | 5620 | 5594.88 | 9301 | 1 | 4 | — | — |
|    |      |         | 9329 | 2 |   | — | — |
| 13 | 5680 | 5655.36 | 9343 | 2 | 12 | — | — |
|    |      |         | 9371 | 3 |   | — | — |
| 14 | 5700 | 5675.52 | 9357 | 3 | 0 | — | — |
|    |      |         | 9385 | 4 |   | — | — |
| 15 | 5765 | 5740.32 | 9402 | 2 | 12 | — | — |
|    |      |         | 9430 | 3 |   | — | — |
| 16 | 5785 | 5760.48 | 9416 | 2 | 20 | — | — |
|    |      |         | 9444 | 3 |   | — | — |
| 17 | 5805 | 5780.64 | 9430 | 3 | 8 | — | — |
|    |      |         | 9458 | 4 |   | — | — |

TABLE 2-4

Example offsets for 80 MHz channel.

| Channel index | Nominal channel center (MHz) | Channel raster F_channel (MHz) | Sync raster (GSCN) | RB-level offset for 30 kHz SCS | Sub-RB-level offset for 30 kHz SCS | RB-level offset for 15 kHz SCS | Sub-RB-level offset for 15 kHz SCS |
|---|---|---|---|---|---|---|---|
| 1 | 5190 | 5190.00 | 8996 | 3 | 4 | — | — |
|   |      |         | 9037 or 9038 | 1 or 5 |   | — | — |
| 2 | 5210 | 5209.98 | 9010 | 3 | 16 | — | — |
|   |      |         | 9051 | 1 |    | — | — |
| 3 | 5290 | 5290.02 | 9065 | 1 | 8 | — | — |
|   |      |         | 9107 | 3 |   | — | — |
| 4 | 5530 | 5530.02 | 9232 | 2 | 16 | — | — |
|   |      |         | 9274 | 4 |   | — | — |
| 5 | 5610 | 5610.00 | 9287 | 0 | 12 | — | — |
|   |      |         | 9329 | 2 |   | — | — |
| 6 | 5690 | 5689.98 | 9343 | 2 | 8 | — | — |
|   |      |         | 9385 | 4 |   | — | — |
| 7 | 5775 | 5775.00 | 9402 | 2 | 4 | — | — |
|   |      |         | 9444 | 4 |   | — | — |
| 8 | 5795 | 5794.98 | 9416 | 2 | 16 | — | — |
|   |      |         | 9458 | 4 |   | — | — |
| 9 | 5855 | 5854.98 | 9458 | 4 | 0 | — | — |
|   |      |         | 9499 | 2 |   | — | — |

Figure 6A:
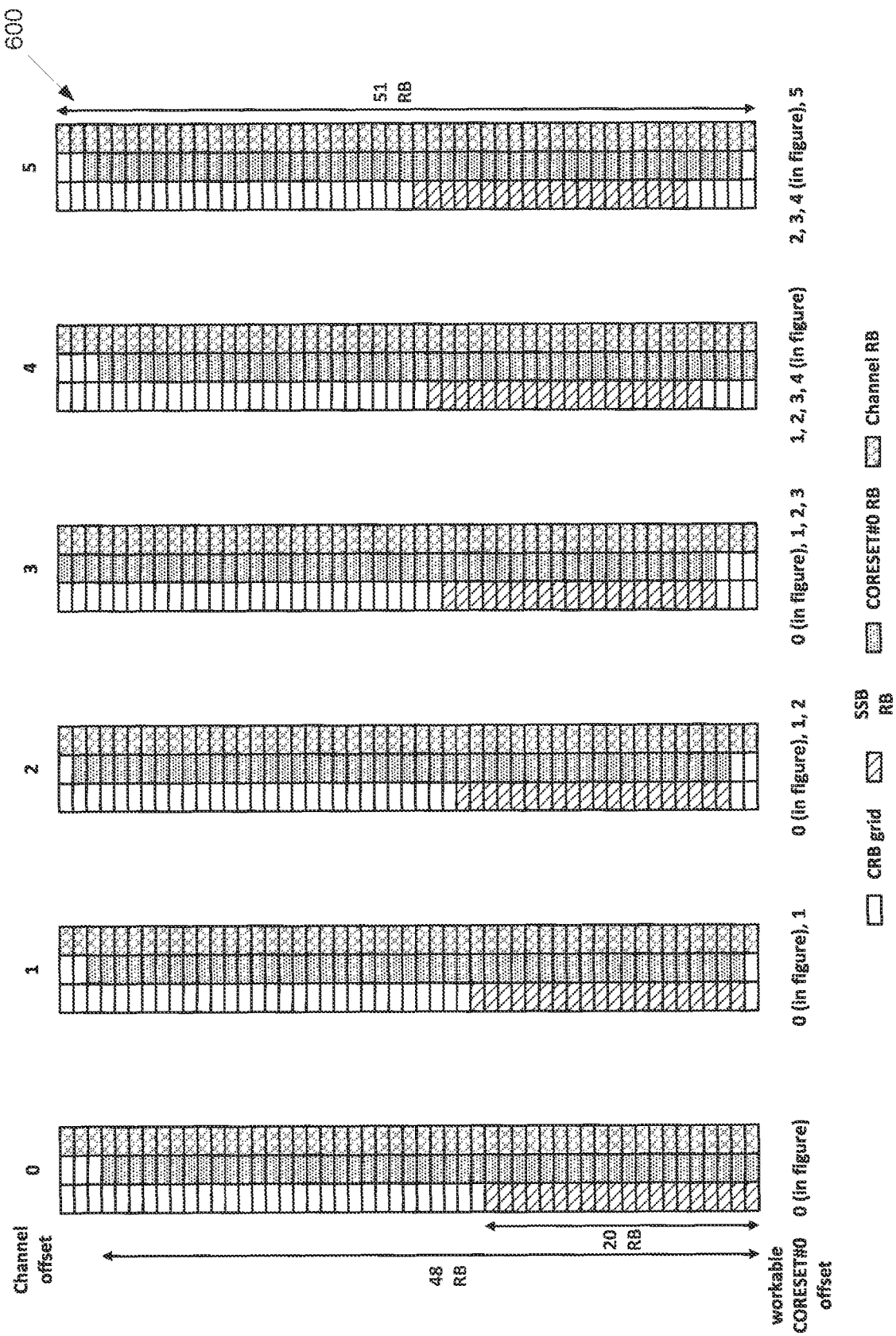
FIG. 6A illustrates an example floating CORESET #0 in carriers with 51 RBs according to embodiments of the present disclosure.

FIG. 6A illustrates an example floating CORESET #0 in carriers with 51 RBs 600 according to embodiments of the present disclosure. An embodiment of the floating CORESET #0 in carriers with 51 RBs 600 shown in FIG. 6A is for illustration only. One or more of the components illustrated in FIG. 6A can be implemented in specialized circuitry configured to perform the noted functions or one or more of the components can be implemented by one or more processors executing instructions to perform the noted functions.

In one example, for the channelization of 20 MHz LBT bandwidth as 51 RBs with respect to 30 kHz, for each given channel supported in NR-U, the possible offsets are illustrated in FIG. 6A, and the corresponding table is given in TABLE 3-1. Then, two CORESET #0 offsets selected as (0, 2), or (0, 3), or (0, 4) can work for all cases (FIG. 6A shows two CORESET #0 offsets as (0, 4)).

TABLE 3-1

CORESET#0 offsets needed for 51 RBs.

| Channel offset | 0 | 1 | 2 | 3 | 4 | 5 |
|---|---|---|---|---|---|---|
| Workable CORESET#0 offset | 0 | 0, 1 | 0, 1, 2 | 0, 1, 2, 3 | 1, 2, 3, 4 | 2, 3, 4, 5 |

Figure 6B:
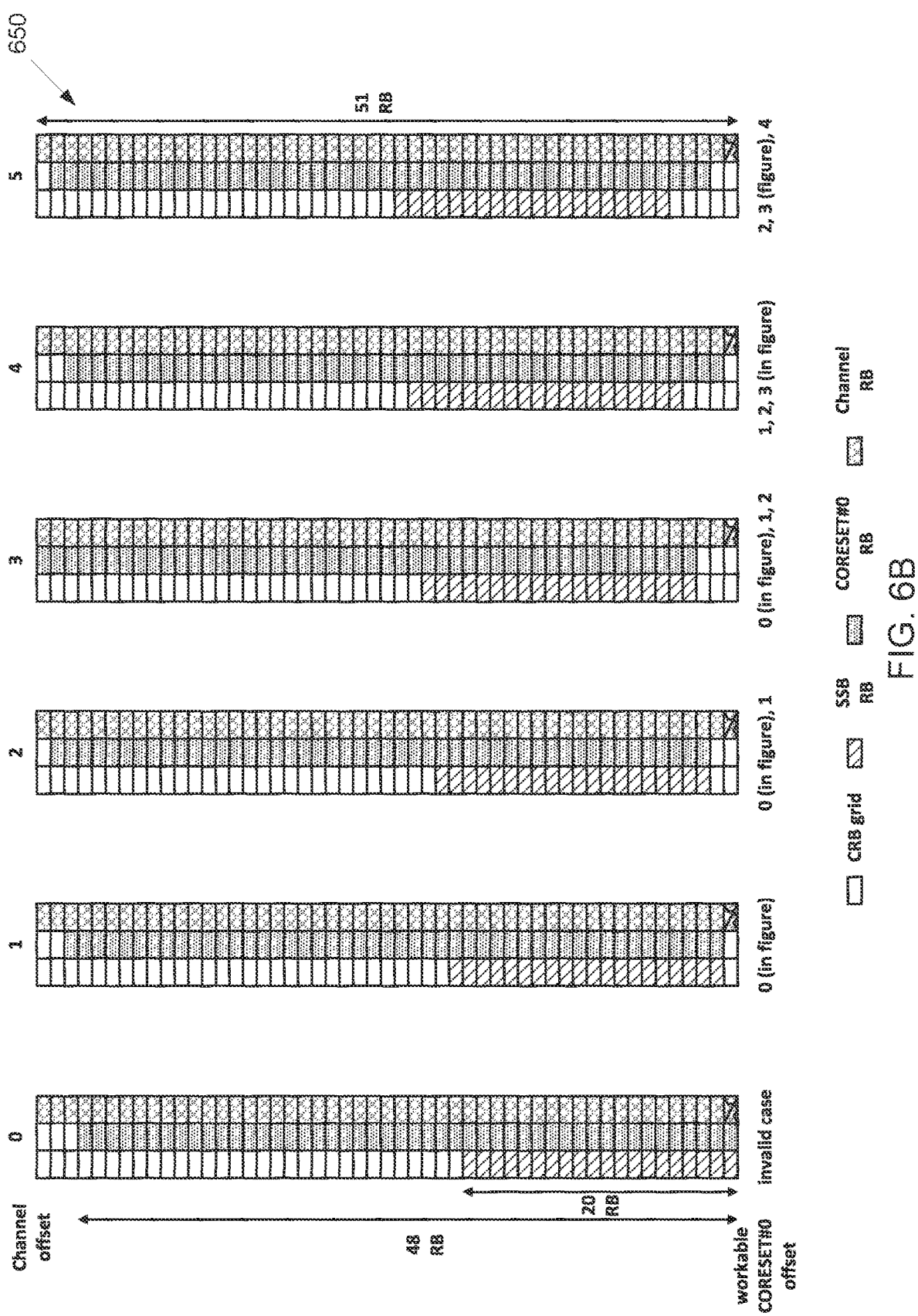
FIG. 6B illustrates an example floating CORESET #0 in carriers with 50 RBs according to embodiments of the present disclosure.
Figure 6C:
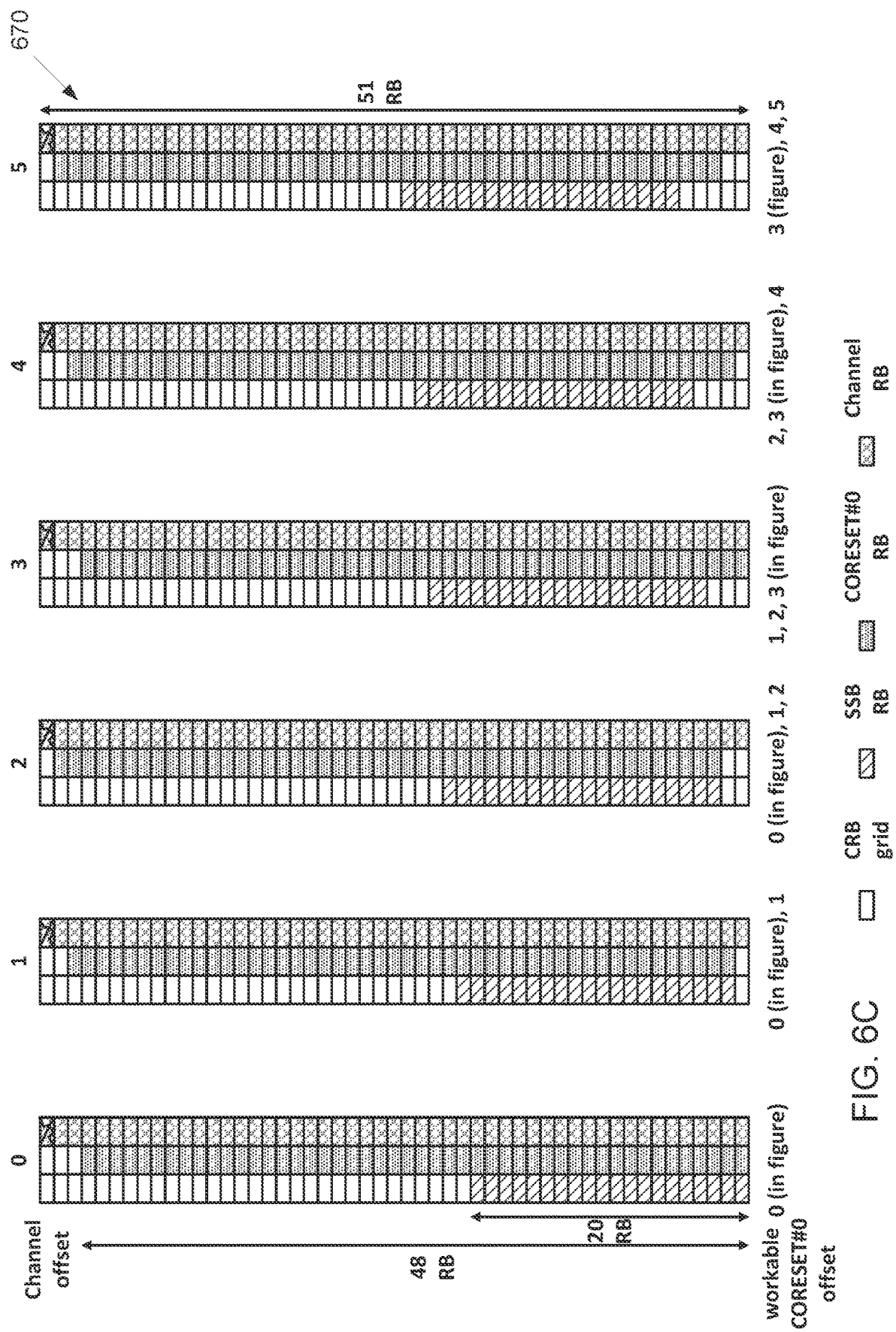
FIG. 6C illustrates another example floating CORESET #0 in carriers with 50 RBs according to embodiments of the present disclosure.

In another example, for the channelization of 20 MHz LBT bandwidth as 50 RBs with respect to 30 kHz, for each given channel supported in NR-U, the possible offsets are illustrated in FIGS. 6B and 6C, and the corresponding table is given in TABLE 3-2. Note that there are two cases, wherein either the highest RB (FIG. 6C) or lowest RB (FIG. 6B) from 51 RBs is truncated (e.g., due to guard band requirement). Then, two CORESET #0 offsets selected as (0, 3) can work for all cases (FIG. 6B and FIG. 6C shows two CORESET #0 offsets as (0, 3)), or (0, 2) can work for cases with lowest RB truncated.

FIG. 6B illustrates an example floating CORESET #0 in carriers with 50 RBs 650 according to embodiments of the present disclosure. An embodiment of the floating CORESET #0 in carriers with 50 RBs 650 shown in FIG. 6B is for illustration only. One or more of the components illustrated in FIG. 6B can be implemented in specialized circuitry configured to perform the noted functions or one or more of the components can be implemented by one or more processors executing instructions to perform the noted functions.

FIG. 6C illustrates another example floating CORESET #0 in carriers with 50 RBs 670 according to embodiments of the present disclosure. An embodiment of the floating CORESET #0 in carriers with 50 RBs 670 shown in FIG. 6C is for illustration only. One or more of the components illustrated in FIG. 6C can be implemented in specialized circuitry configured to perform the noted functions or one or more of the components can be implemented by one or more processors executing instructions to perform the noted functions.

TABLE 3-2

CORESET#0 offsets needed for 50 RBs.

| Channel offset | 0 | 1 | 2 | 3 | 4 | 5 |
|---|---|---|---|---|---|---|
| Workable CORESET#0 offset (lowest RB truncated) | Invalid | 0 | 0, 1 | 0, 1, 2 | 1, 2, 3 | 2, 3, 4 |

TABLE 3-2-continued

CORESET#0 offsets needed for 50 RBs.

| Channel offset | 0 | 1 | 2 | 3 | 4 | 5 |
|---|---|---|---|---|---|---|
| Workable CORESET#0 offset (highest RB truncated) | 0 | 0, 1 | 0, 1, 2 | 1, 2, 3 | 2, 3, 4 | 3, 4, 5 |

For the channelization of 20 MHz LBT bandwidth as 49 RBs with respect to 30 kHz, for each given channel supported in NR-U, the possible offsets are illustrated in TABLE 3-3. Note that there are three cases, wherein either the highest 2 RBs or lowest 2 RBs or the highest and lowest RB from 51 RBs are truncated (e.g., due to guard band requirement). Then, three CORESET #0 offsets selected as (0, 2, 4) can work for all cases.

TABLE 3-3

CORESET#0 offsets needed for 49 RBs.

| Channel offset | 0 | 1 | 2 | 3 | 4 | 5 |
|---|---|---|---|---|---|---|
| Workable CORESET#0 offset (lowest 2 RBs truncated) | invalid | invalid | 0 | 0, 1 | 1, 2 | 2, 3 |
| Workable CORESET#0 offset (highest and lowest RB truncated) | invalid | 0 | 0, 1 | 1, 2 | 2, 3 | 3, 4 |
| Workable CORESET#0 offset (highest 2 RBs truncated) | 0 | 0, 1 | 1, 2 | 2, 3 | 3, 4 | 4, 5 |

For the channelization of 20 MHz LBT bandwidth as 48 RBs with respect to 30 kHz, for each given channel supported in NR-U, the possible offsets are illustrated in TABLE 3-4. Note that there are four cases, wherein either the highest 3 RBs or highest 2 with lowest 1, or highest 1 with lowest 2, or lowest 3 RBs from 51 RBs are truncated (e.g., due to guard band requirement). Then, 6 CORESET #0 offsets can work for all cases.

TABLE 3-4

CORESET#0 offsets needed for 48 RBs.

| Channel offset | 0 | 1 | 2 | 3 | 4 | 5 |
|---|---|---|---|---|---|---|
| Workable CORESET#0 offset (lowest 3 RBs truncated) | invalid | invalid | invalid | 0 | 1 | 2 |
| Workable CORESET#0 offset (highest 1 and lowest 2 RBs truncated) | invalid | invalid | 0 | 1 | 2 | 3 |
| Workable CORESET#0 offset (highest 2 and lowest 1 RBs truncated) | invalid | 0 | 1 | 2 | 3 | 4 |
| Workable CORESET#0 offset (highest 3 RBs truncated) | 0 | 1 | 2 | 3 | 4 | 5 |

In one embodiment, the sub-RB-level offset is hard-coded in the specification. In one example, for a given synchronization raster entry, and a given carrier bandwidth, the sub-RB-level offset is as given by the examples in TABLE 1-1 to TABLE 1-6.

In one example, the sub-RB-level offset is indicated in PBCH payload. For one example, 5 bits are used for indicating the sub-RB-level offset, e.g., same as Rel-15 and denoted as k_SSB. In another example, candidate values for the sub-RB-level offset are given by {0, 2, 4, 6, 8, 10, 12, 14, 16, 18, 20, 22}, and 4 bits (e.g., in MIB) are sufficient for this purpose. In yet another example, candidate values for the sub-RB-level offset are given by {0, 4, 8, 12, 16, 20}, and 3 bits (e.g., in MIB) are sufficient for this purpose.

In one embodiment, the RB-level offset is hard-coded in the specification. In one example, for a given synchronization raster entry, and a given carrier bandwidth, the RB-level offset is as given by the examples in TABLE 1-1 to TABLE 1-6.

In another embodiment, the RB-level offset is indicated by PBCH payload (e.g., MIB), together with the multiplexing pattern with SSB, the number of symbols for CORESET #0, and the bandwidth of CORESET #0, as part of the CORESET #0 configuration.

In one example, for {SCS_SSB, SCS_CORESET}={30 kHz, 30 kHz}, the RB-level offset is configurable from {0, 1, 2, 3, 4, 5} (note that this set is the collection of all possible values needed as calculated in this disclosure for SCS_SSB, SCS_CORESET}={30 kHz, 30 kHz}), and an example configuration table is given by TABLE 4-1. In one example, reserved rows can be added to TABLE 4-1, such that the total number of rows is 16 (e.g., maintaining the same table size as Rel-15).

TABLE 4-1

Example CORESET #0 configuration table for {SCS_SSB, SCS_CORESET} = {30 kHz, 30 kHz}

| Index | Multiplexing pattern | CORESET#0 BW | No. of symbols for CORESET #0 | RB-level offset |
|---|---|---|---|---|
| 0 | 1 | 48 | 1 | 0 |
| 1 | 1 | 48 | 1 | 1 |
| 2 | 1 | 48 | 1 | 2 |
| 3 | 1 | 48 | 1 | 3 |
| 4 | 1 | 48 | 1 | 4 |
| 5 | 1 | 48 | 1 | 5 |
| 6 | 1 | 48 | 2 | 0 |
| 7 | 1 | 48 | 2 | 1 |
| 8 | 1 | 48 | 2 | 2 |
| 9 | 1 | 48 | 2 | 3 |
| 10 | 1 | 48 | 2 | 4 |
| 11 | 1 | 48 | 2 | 5 |

In another example, for {SCS_SSB, SCS_CORESET}={30 kHz, 30 kHz}, the RB-level offset is configurable from a subset of {0, 1, 2, 3, 4, 5}. In one instance, the CORESET #0 can be floating within the carrier by noting that the BW of CORESET #0 is smaller than the BW of carrier, such that one configuration of RB-level offset can be reused for multiple carriers. For instance, for {SCS_SSB, SCS_CORESET} {30 kHz, 30 kHz}, the BW of SSB is 48 RBs, and the BW of CORESET #0 is 51 RBs for 20 MHz, then one configuration of the RB-level offset can be reused for carriers with 4 different contiguous RB-level offset values and based on the calculation in this disclosure, at most 6 different contiguous RB-level offset values from {0, 1, 2, 3, 4, 5} show up. Hence, at least 2 configurations on the RB-level offset are sufficient.

An illustration of the floating CORESET #0 within the carrier is shown in FIG. 4-1. In one consideration, although minimum number of required offsets is 2, the number of supported offset to be configured can be more than 2 to allow better flexibility, as long as the total number of configurations can fit 4 bits as in NR Rel-15. Example configuration tables are given by TABLE 4-2 to TABLE 4-8. In one consideration to the example tables, reserved rows can be added to TABLE 4-2 to TABLE 4-8, such that the total number of rows is 16 (e.g., maintaining the same table size as Rel-15).

TABLE 4-2

Example CORESET #0 configuration table for {SCS_SSB, SCS_CORESET} = {30 kHz, 30 kHz}

| Index | Multiplexing pattern | CORESET#0 BW | No. of symbols for CORESET #0 | RB-level offset |
|---|---|---|---|---|
| 0 | 1 | 48 | 1 | 0 |
| 1 | 1 | 48 | 1 | 1 |
| 2 | 1 | 48 | 2 | 0 |
| 3 | 1 | 48 | 2 | 1 |

TABLE 4-3

Example CORESET #0 configuration table for {SCS_SSB, SCS_CORESET} = {30 kHz, 30 kHz}

| Index | Multiplexing pattern | CORESET#0 BW | No. of symbols for CORESET #0 | RB-level offset |
|---|---|---|---|---|
| 0 | 1 | 48 | 1 | 0 |
| 1 | 1 | 48 | 1 | 4 |
| 2 | 1 | 48 | 2 | 0 |
| 3 | 1 | 48 | 2 | 4 |

TABLE 4-4

Example CORESET #0 configuration table for {SCS_SSB, SCS_CORESET} = {30 kHz, 30 kHz}

| Index | Multiplexing pattern | CORESET#0 BW | No. of symbols for CORESET #0 | RB-level offset |
|---|---|---|---|---|
| 0 | 1 | 48 | 1 | 0 |
| 1 | 1 | 48 | 1 | 2 |
| 2 | 1 | 48 | 2 | 0 |
| 3 | 1 | 48 | 2 | 2 |

TABLE 4-5

Example CORESET #0 configuration table for {SCS_SSB, SCS_CORESET} = {30 kHz, 30 kHz}

| Index | Multiplexing pattern | CORESET#0 BW | No. of symbols for CORESET #0 | RB-level offset |
|---|---|---|---|---|
| 0 | 1 | 48 | 1 | 0 |
| 1 | 1 | 48 | 1 | 3 |
| 2 | 1 | 48 | 2 | 0 |
| 3 | 1 | 48 | 2 | 3 |

TABLE 4-6

Example CORESET #0 configuration table for {SCS_SSB, SCS_CORESET} = {30 kHz, 30 kHz}

| Index | Multiplexing pattern | CORESET#0 BW | No. of symbols for CORESET #0 | RB-level offset |
|---|---|---|---|---|
| 0 | 1 | 48 | 1 | 0 |
| 1 | 1 | 48 | 1 | 2 |
| 2 | 1 | 48 | 1 | 4 |

TABLE 4-6-continued

Example CORESET #0 configuration table for {SCS_SSB, SCS_CORESET} = {30 kHz, 30 kHz}

| Index | Multiplexing pattern | CORESET#0 BW | No. of symbols for CORESET #0 | RB-level offset |
|---|---|---|---|---|
| 3 | 1 | 48 | 2 | 0 |
| 4 | 1 | 48 | 2 | 2 |
| 5 | 1 | 48 | 2 | 4 |

TABLE 4-7

Example CORESET #0 configuration table for {SCS_SSB, SCS_CORESET} = {30 kHz, 30 kHz}

| Index | Multiplexing pattern | CORESET#0 BW | No. of symbols for CORESET #0 | RB-level offset |
|---|---|---|---|---|
| 0 | 1 | 48 | 1 | 0 |
| 1 | 1 | 48 | 1 | 1 |
| 2 | 1 | 48 | 1 | 2 |
| 3 | 1 | 48 | 1 | 3 |
| 4 | 1 | 48 | 2 | 0 |
| 5 | 1 | 48 | 2 | 1 |
| 6 | 1 | 48 | 2 | 2 |
| 7 | 1 | 48 | 2 | 3 |

TABLE 4-8

Example CORESET #0 configuration table for {SCS_SSB, SCS_CORESET} = {30 kHz, 30 kHz}

| Index | Multiplexing pattern | CORESET#0 BW | No. of symbols for CORESET #0 | RB-level offset |
|---|---|---|---|---|
| 0 | 1 | 48 | 1 | 0 |
| 1 | 1 | 48 | 1 | 1 |
| 2 | 1 | 48 | 1 | 2 |
| 3 | 1 | 48 | 1 | 3 |
| 4 | 1 | 48 | 1 | 4 |
| 5 | 1 | 48 | 2 | 0 |
| 6 | 1 | 48 | 2 | 1 |
| 7 | 1 | 48 | 2 | 2 |
| 8 | 1 | 48 | 2 | 3 |
| 9 | 1 | 48 | 2 | 4 |

In yet another example, for {SCS_SSB, SCS_CORESET}={15 kHz, 15 kHz}, the RB-level offset is configurable from {13, 14, 15, 16, 17, 18, 19, 20} (note that this set is the collection of all possible values needed as calculated in this disclosure for SCS_SSB, SCS_CORESET}={15 kHz, 15 kHz}), and an example configuration table is given by TABLE 5-1. Note that this example assumes the SSB is located at the synchronization raster as the reference to design the table when the SCS of SSB is 15 kHz.

TABLE 5-1

Example CORESET #0 configuration table for {SCS_SSB, SCS_CORESET} = {15 kHz, 15 kHz}

| Index | Multiplexing pattern | CORESET#0 BW | No. of symbols for CORESET #0 | RB-level offset |
|---|---|---|---|---|
| 0 | 1 | 48 | 1 | 13 |
| 1 | 1 | 48 | 1 | 14 |
| 2 | 1 | 48 | 1 | 15 |
| 3 | 1 | 48 | 1 | 16 |
| 4 | 1 | 48 | 1 | 17 |
| 5 | 1 | 48 | 1 | 18 |
| 6 | 1 | 48 | 1 | 19 |
| 7 | 1 | 48 | 1 | 20 |
| 8 | 1 | 48 | 2 | 13 |
| 9 | 1 | 48 | 2 | 14 |
| 10 | 1 | 48 | 2 | 15 |
| 11 | 1 | 48 | 2 | 16 |
| 12 | 1 | 48 | 2 | 17 |
| 13 | 1 | 48 | 2 | 18 |
| 14 | 1 | 48 | 2 | 19 |
| 15 | 1 | 48 | 2 | 20 |

In yet another example, for {SCS_SSB SCS_CORESET}={15 kHz, 15 kHz}, the RB-level offset is configurable from {0, 1, 2, 3, 4, 5, 6, 7} (note that this set is the collection of all possible values needed as calculated in this disclosure for SCS_SSB, SCS_CORESET}={15 kHz, 15 kHz}, with a predefined offset as 13 RB to define the values), and an example configuration table is given by TABLE 5-2. Note that this example assumes the SSB is located at 13 RBs from the synchronization raster as the reference to design the table when the SCS of SSB is 15 kHz.

TABLE 5-2

Example CORESET #0 configuration table for {SCS_SSB, SCS_CORESET} = {15 kHz, 15 kHz}

| Index | Multiplexing pattern | CORESET#0 BW | No. of symbols for CORESET #0 | RB-level offset |
|---|---|---|---|---|
| 0 | 1 | 48 | 1 | 0 |
| 1 | 1 | 48 | 1 | 1 |
| 2 | 1 | 48 | 1 | 2 |
| 3 | 1 | 48 | 1 | 3 |
| 4 | 1 | 48 | 1 | 4 |
| 5 | 1 | 48 | 1 | 5 |
| 6 | 1 | 48 | 1 | 6 |
| 7 | 1 | 48 | 1 | 7 |
| 8 | 1 | 48 | 2 | 0 |
| 9 | 1 | 48 | 2 | 1 |
| 10 | 1 | 48 | 2 | 2 |
| 11 | 1 | 48 | 2 | 3 |
| 12 | 1 | 48 | 2 | 4 |
| 13 | 1 | 48 | 2 | 5 |
| 14 | 1 | 48 | 2 | 6 |
| 15 | 1 | 48 | 2 | 7 |

In yet another example, for {SCS_SSB, SCS_CORESET}={15 kHz, 15 kHz}, the CORESET #0 can be floating within the carrier by noting that the BW of CORESET #0 is smaller than the BW of carrier, such that one configuration of RB-level offset can be reused for multiple carriers. For instance, for {SCS_SSB, SCS_CORESET}={15 kHz, 15 kHz}, the BW of SSB is 96 RBs, and the BW of CORESET #0 is 106 RBs for 20 MHz, then one configuration of the RB-level offset can be reused for carriers with 11 different contiguous RB-level offset values and based on the calculation in this disclosure, at most 11 different contiguous RB-level offset values show up in TABLE 1-5 and TABLE 1-6. Hence, an example configuration table is given by TABLE 5-3, wherein X can be a value selected from {10, 11, 12, 13, 14, 15, 16, 17, 18, 19, 20, 21}, e.g., X=10, or X=13, or X=20, or X=21, or X=17, or X=11. Note that this example assumes the SSB is located at the synchronization raster as the reference to design the table when the SCS of SSB is 15 kHz.

TABLE 5-3

Example CORESET #0 configuration table for {SCS_SSB, SCS_CORESET} = {15 kHz, 15 kHz}

| Index | Multiplexing pattern | CORESET#0 BW | No. of symbols for CORESET #0 | RB-level offset |
|---|---|---|---|---|
| 0 | 1 | 96 | 1 | X |
| 1 | 1 | 96 | 2 | X |

In yet another example, for {SCS_SSB, SCS_CORESET}={15 kHz, 15 kHz}, the CORESET #0 can be floating within the carrier by noting that the BW of CORESET #0 is smaller than the BW of carrier, such that one configuration of RB-level offset can be reused for multiple carriers. For instance, for {SCS_SSB, SCS_CORESET}={15 kHz, 15 kHz}, the BW of SSB is 96 RBs, and the BW of CORESET #0 is 106 RBs for 20 MHz, then one configuration of the RB-level offset can be reused for carriers with 11 different contiguous RB-level offset values, and based on the calculation in this disclosure, at most 11 different contiguous RB-level offset values show up in TABLE 1-5 and TABLE 1-6. Hence, an example configuration table is given by TABLE 5-3, wherein X can be a value selected from {0, 1, 2, 3, 4, 5, 6, 7, 8, 9, 10, 11}, e.g., X=0, or X=3. Note that this example assumes the SSB is located at 10 RBs or 13 RBs from the synchronization raster as the reference to design the table when the SCS of SSB is 15 kHz.

In yet another example, for {SCS_SSB, SCS_CORESET}={15 kHz, 15 kHz}, the CORESET #0 can be floating within the carrier by noting that the BW of CORESET #0 is smaller than the BW of carrier, such that one configuration of RB-level offset can be reused for multiple carriers. For instance, for {SCS_SSB, SCS_CORESET}={15 kHz, 15 kHz}, the BW of SSB is 96 RBs, and the BW of CORESET #0 is 106 RBs for 20 MHz, then one configuration of the RB-level offset can be reused for carriers with 11 different contiguous RB-level offset values.

Hence, an example configuration table is given by TABLE 5-4, wherein X and Y can be a value selected from {10, 11, 12, 13, 14, 15, 16, 17, 18, 19, 20, 21} such that Y−X≤10, e.g., {X, Y}={10, 20}, or {X, Y}={13, 20}, or {X, Y}={13, 14}, or {X, Y}={19, 20}, or {X, Y}={20, 21}, or {X, Y}={10, 11}, or {X, Y}={10, 12}, or {X, Y}={10, 14}, or {X, Y}={10, 16}, or {X, Y}={10, 18}, or {X, Y}={13, 21}, or {X, Y}={11, 21}. Note that this example assumes the SSB is located at the synchronization raster as the reference to design the table when the SCS of SSB is 15 kHz.

TABLE 5-4

Example CORESET #0 configuration table for {SCS_SSB, SCS_CORESET} = {15 kHz, 15 kHz}

| Index | Multiplexing pattern | CORESET#0 BW | No. of symbols for CORESET #0 | RB-level offset |
|---|---|---|---|---|
| 0 | 1 | 96 | 1 | X |
| 1 | 1 | 96 | 1 | Y |
| 2 | 1 | 96 | 2 | X |
| 3 | 1 | 96 | 2 | Y |

In yet another example, for {SCS_SSB, SCS_CORESET} {15 kHz, 15 kHz}, the CORESET #0 can be floating within the carrier by noting that the BW of CORESET #0 is smaller than the BW of carrier, such that one configuration of RB-level offset can be reused for multiple carriers. For instance, for {SCS_SSB, SCS_CORESET}={15 kHz, 15 kHz}, the BW of SSB is 96 RBs, and the BW of CORESET #0 is 106 RBs for 20 MHz, then one configuration of the RB-level offset can be reused for carriers with 11 different contiguous RB-level offset values. Hence, an example configuration table is given by TABLE 5-4, wherein X and Y can be a value selected from {0, 1, 2, 3, 4, 5, 6, 7, 8, 9, 10, 11} such that Y−X≤10, e.g., {X, Y}={0, 10}, or {X, Y}={3, 10}, or {X, Y}={0, 7}, or {X, Y}={0, 1}, or {X, Y}={3, 4}, or {X, Y}={9, 10}, or {X, Y}={10, 11}, or {X, Y}={0, 2}, or {X, Y}={0, 4}, or {X, Y}={0, 6}, or {X, Y}={0, 8}. Note that this example assumes the SSB is located at 10 RBs or 13 RBs from the synchronization raster as the reference to design the table when the SCS of SSB is 15 kHz.

In yet another example, for {SCS_SSB, SCS_CORESET}={15 kHz, 15 kHz}, the number of offsets in the set of configurable offsets corresponding to {SCS_SSB, SCS_CORESET}={15 kHz, 15 kHz} is the same as the number of offsets in the set of configurable offsets corresponding to {SCS_SSB, SCS_CORESET} {30 kHz, 30 kHz}, and the value of the offset in the set of configurable offsets corresponding to {SCS_SSB, SCS_CORESET}={15 kHz, 15 kHz} has a one-to-one mapping to the value of the offset in the set of configurable offsets corresponding to {SCS_SSB, SCS_CORESET}={30 kHz, 30 kHz}, e.g., O_15=O_30*2+10, wherein O_15 is the value of the offset in the set of configurable offsets corresponding to {SCS_SSB, SCS_CORESET}={15 kHz, 15 kHz}, and O_30 is the value of the offset in the set of configurable offsets corresponding to {SCS_SSB, SCS_CORESET}={30 kHz, 30 kHz}.

The example configuration tables for {SCS_SSB, SCS_CORESET}={15 kHz, 15 kHz}, corresponding to TABLE 6-1 to TABLE 6-8, using the mapping relationship of this example are shown in TABLE 6-1 to TABLE 6-8. In one instance, reserved rows can be added to TABLE 6-1 to TABLE 6-8, such that the total number of rows is 16 (e.g., maintaining the same table size as Rel-15).

TABLE 6-1

Example CORESET #0 configuration table for {SCS_SSB, SCS_CORESET} = {15 kHz, 15 kHz}

| Index | Multiplexing pattern | CORESET#0 BW | No. of symbols for CORESET #0 | RB-level offset |
|---|---|---|---|---|
| 0 | 1 | 96 | 1 | 10 |
| 1 | 1 | 96 | 1 | 12 |
| 2 | 1 | 96 | 1 | 14 |
| 3 | 1 | 96 | 1 | 16 |
| 4 | 1 | 96 | 1 | 18 |
| 5 | 1 | 96 | 1 | 20 |
| 6 | 1 | 96 | 2 | 10 |
| 7 | 1 | 96 | 2 | 12 |
| 8 | 1 | 96 | 2 | 14 |
| 9 | 1 | 96 | 2 | 16 |
| 10 | 1 | 96 | 2 | 18 |
| 11 | 1 | 96 | 2 | 20 |

TABLE 6-2

Example CORESET #0 configuration
table for {SCS_SSB, SCS_CORESET} =
{15 kHz, 15 kHz}

| Index | Multiplexing pattern | CORESET#0 BW | No. of symbols for CORESET #0 | RB-level offset |
|---|---|---|---|---|
| 0 | 1 | 96 | 1 | 10 |
| 1 | 1 | 96 | 1 | 12 |
| 2 | 1 | 96 | 2 | 10 |
| 3 | 1 | 96 | 2 | 12 |

TABLE 6-3

Example CORESET #0 configuration
table for {SCS_SSB, SCS_CORESET} =
{15 kHz, 15 kHz}

| Index | Multiplexing pattern | CORESET#0 BW | No. of symbols for CORESET #0 | RB-level offset |
|---|---|---|---|---|
| 0 | 1 | 96 | 1 | 10 |
| 1 | 1 | 96 | 1 | 18 |
| 2 | 1 | 96 | 2 | 10 |
| 3 | 1 | 96 | 2 | 18 |

TABLE 6-4

Example CORESET #0 configuration
table for {SCS_SSB, SCS_CORESET} =
{15 kHz, 15 kHz}

| Index | Multiplexing pattern | CORESET#0 BW | No. of symbols for CORESET #0 | RB-level offset |
|---|---|---|---|---|
| 0 | 1 | 96 | 1 | 10 |
| 1 | 1 | 96 | 1 | 14 |
| 2 | 1 | 96 | 2 | 10 |
| 3 | 1 | 96 | 2 | 14 |

TABLE 6-5

Example CORESET #0 configuration
table for {SCS_SSB, SCS_CORESET} =
{15 kHz, 15 kHz}

| Index | Multiplexing pattern | CORESET#0 BW | No. of symbols for CORESET #0 | RB-level offset |
|---|---|---|---|---|
| 0 | 1 | 96 | 1 | 10 |
| 1 | 1 | 96 | 1 | 16 |
| 2 | 1 | 96 | 2 | 10 |
| 3 | 1 | 96 | 2 | 16 |

TABLE 6-6

Example CORESET #0 configuration
table for {SCS_SSB, SCS_CORESET} =
{15 kHz, 15 kHz}

| Index | Multiplexing pattern | CORESET#0 BW | No. of symbols for CORESET #0 | RB-level offset |
|---|---|---|---|---|
| 0 | 1 | 96 | 1 | 10 |
| 1 | 1 | 96 | 1 | 14 |
| 2 | 1 | 96 | 1 | 18 |
| 3 | 1 | 96 | 2 | 10 |
| 4 | 1 | 96 | 2 | 14 |
| 5 | 1 | 96 | 2 | 18 |

TABLE 6-7

Example CORESET #0 configuration
table for {SCS_SSB, SCS_CORESET} =
{15 kHz, 15 kHz}

| Index | Multiplexing pattern | CORESET#0 BW | No. of symbols for CORESET #0 | RB-level offset |
|---|---|---|---|---|
| 0 | 1 | 96 | 1 | 10 |
| 1 | 1 | 96 | 1 | 12 |
| 2 | 1 | 96 | 1 | 14 |
| 3 | 1 | 96 | 1 | 16 |
| 4 | 1 | 96 | 2 | 10 |
| 5 | 1 | 96 | 2 | 12 |
| 6 | 1 | 96 | 2 | 14 |
| 7 | 1 | 96 | 2 | 16 |

TABLE 6-8

Example CORESET #0 configuration
table for {SCS_SSB, SCS_CORESET} =
{15 kHz, 15 kHz}

| Index | Multiplexing pattern | CORESET#0 BW | No. of symbols for CORESET #0 | RB-level offset |
|---|---|---|---|---|
| 0 | 1 | 96 | 1 | 10 |
| 1 | 1 | 96 | 1 | 12 |
| 2 | 1 | 96 | 1 | 14 |
| 3 | 1 | 96 | 1 | 16 |
| 4 | 1 | 96 | 1 | 18 |
| 5 | 1 | 96 | 2 | 10 |
| 6 | 1 | 96 | 2 | 12 |
| 7 | 1 | 96 | 2 | 14 |
| 8 | 1 | 96 | 2 | 16 |
| 9 | 1 | 96 | 2 | 18 |

In one example, for SS/PBCH block and CORESET multiplexing pattern 1, when multiple SCSs are supported for SS/PBCH block and its associated CORESET #0, for a given configured bandwidth of CORESET #0, the number of offsets in the set of configurable offsets corresponding to the given CORESET #0 bandwidth is the same for all the supported SCSs, and the value of the offset in the set of configurable offsets corresponding to the given CORESET #0 bandwidth has a one-to-one mapping relationship among all the supported SCSs.

For instance, for a given configured bandwidth of CORESET #0, and for a first supported SCS_1 (i.e., {SCS_SSB, SCS_CORESET} {SCS_1, SCS_1}) and a second supported SCS_2 (i.e., {SCS_SSB, SCS_CORESET}={SCS_2, SCS_2}), a value of the offset in the set of configurable offsets corresponding to the first SCS (denoted as O_1) and a value of the offset in the set of configurable offsets corresponding to the second SCS (denoted as O_2) have the relationship as O_2=O_1*R_SCS+BW_SSB*R_SCS/2−BW_SSB/2, wherein R_SCS=SCS_1/SCS_2 is the ratio of SCSs, and BW_SSB is the BW of SS/PBCH block in term of its SCS (e.g., BW_SSB=20 RBs). The generalization of this example is based on an assumption that SS/PBCH blocks with different SCSs are center aligned on the same reference frequency location (e.g., a synchronization raster entry), and an illustration of the mapping relationship between different SCSs is shown in FIG. 7.

Figure 7:
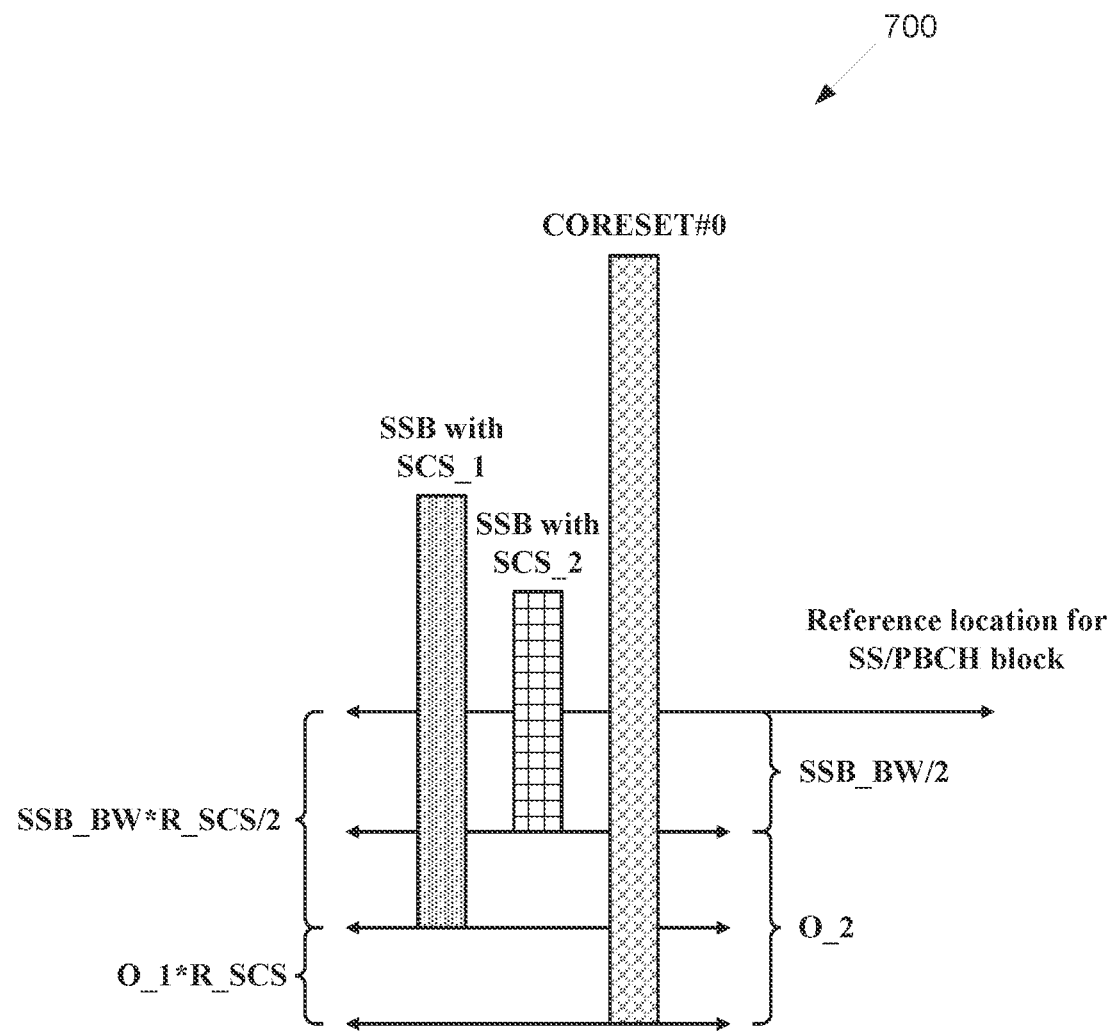
FIG. 7 illustrates an example mapping relationship between SCSs according to embodiments of the present disclosure.

FIG. 7 illustrates an example mapping relationship between SCSs 700 according to embodiments of the present disclosure. An embodiment of the mapping relationship between SCSs 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

In yet another example, for {SCS_SSB, SCS_CORESET}={15 kHz, 15 kHz}, the number of offsets in the set of configurable offsets corresponding to {SCS_SSB, SCS_CORESET}={15 kHz, 15 kHz} is the same as the number of offsets in the set of configurable offsets corresponding to {SCS_SSB, SCS_CORESET} {30 kHz, 30 kHz}, and the value of the offset in the set of configurable offsets corresponding to {SCS_SSB, SCS_CORESET}={15 kHz, 15 kHz} has a one-to-one mapping to the value of the offset in the set of configurable offsets corresponding to {SCS_SSB, SCS_CORESET} {30 kHz, 30 kHz}, e.g., O_15=O_30*2+Z, wherein O_15 is the value of the offset in the set of configurable offsets corresponding to {SCS_SSB, SCS_CORESET}={15 kHz, 15 kHz}, O_30 is the value of the offset in the set of configurable offsets corresponding to {SCS_SSB, SCS_CORESET}={30 kHz, 30 kHz}, and Z is a constant integer, e.g., Z=13

In one example, for SS/PBCH block and CORESET multiplexing pattern 1, when multiple SCSs are supported for SS/PBCH block and its associated CORESET #0, for a given configured bandwidth of CORESET #0, the number of offsets in the set of configurable offsets corresponding to the given CORESET #0 bandwidth is the same for all the supported SCSs, and the value of the offset in the set of configurable offsets corresponding to the given CORESET #0 bandwidth has a one-to-one mapping relationship among all the supported SCSs. For instance, for a given configured bandwidth of CORESET #0, for a first supported SCS_1 (i.e., {SCS_SSB, SCS_CORESET} {SCS_1, SCS_1}) and a second supported SCS_2 (i.e., {SCS_SSB, SCS_CORESET} {SCS_2, SCS_21}), a value of the offset in the set of configurable offsets corresponding to the first SCS (denoted as O_1) and a value of the offset in the set of configurable offsets corresponding to the second SCS (denoted as O_2) have the relationship as O_2=O_1*R_SCS+Z, wherein R_SCS=SCS_1/SCS_2 is the ratio of SCSs, and Z is a constant integer, e.g., Z=0.

Figure 8:
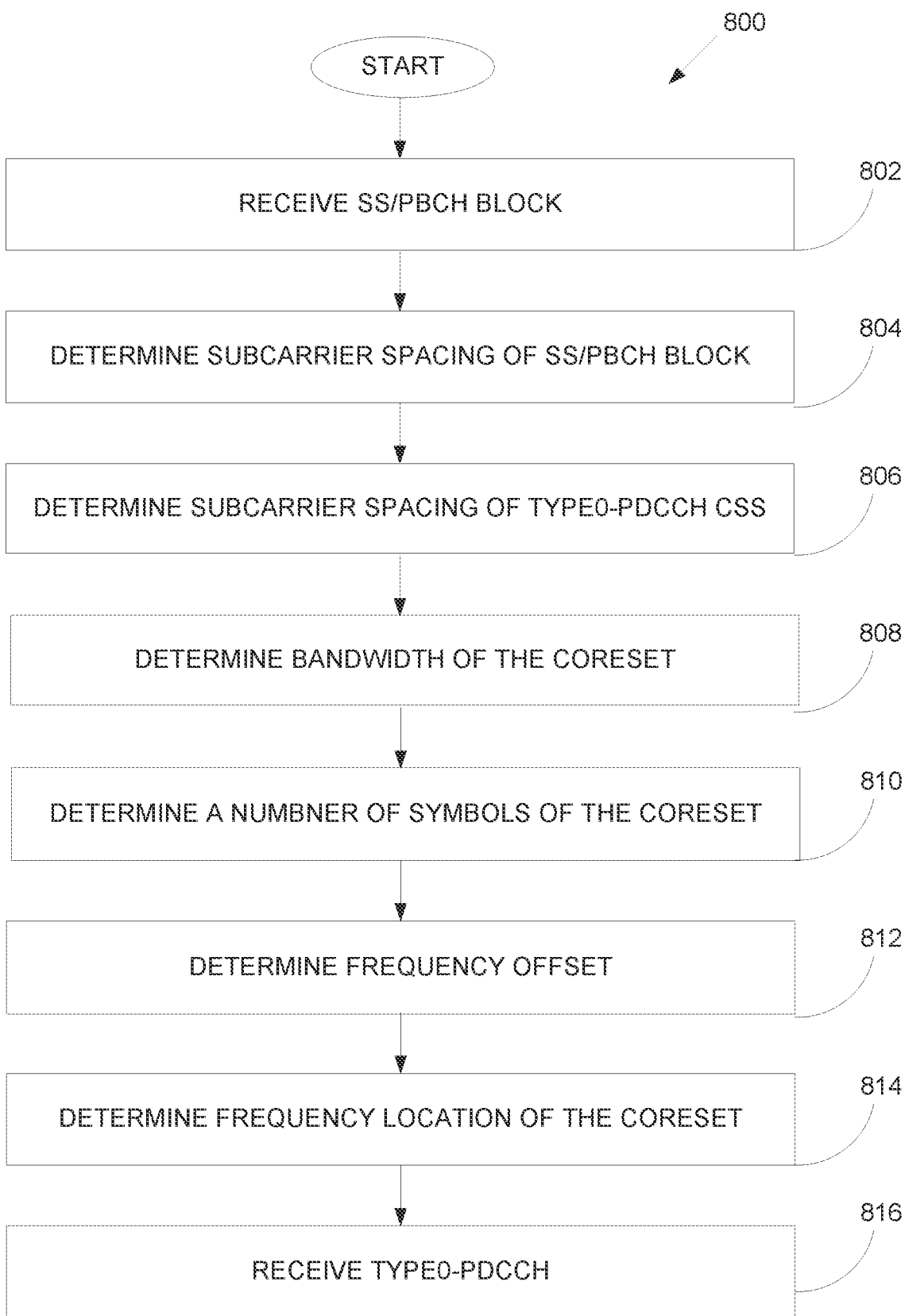
FIG. 8 illustrates a flowchart of a method for configuring CORESET according to embodiments of the present disclosure.

FIG. 8 illustrates a flowchart of a method 800 for configuring CORESET according to embodiments of the present disclosure, as may be performed by a use equipment (UE) (e.g., 111-116 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, the method 800 begins at step 802. In step 802, the UE receives a synchronization signals and physical broadcast channel (SS/PBCH) block.

Subsequently, the UE in step 804 determines a subcarrier spacing of the SS/PBCH block from a set of subcarrier spacings $\{SCS_1, SCS_2\}$.

Subsequently, the UE in step 806 determines a subcarrier spacing of a type0 physical downlink control channel (Type0-PDCCH) common search space (CSS) set in a control resource set (CORESET), wherein the subcarrier spacing of the Type0-PDCCH CSS set is the same as the subcarrier spacing of the SS/PBCH block.

Subsequently, the UE in step 808 determines a bandwidth of the CORESET based on master information block (MIB) in the SS/PBCH block.

Subsequently, the UE in step 810 determines a number of symbols of the CORESET based on the MIB.

Next, the UE in step 812 determines, based on the MIB and the subcarrier spacing of the SS/PBCH block, a frequency offset from a set of frequency offsets $\{O_1, O_2\}$, wherein the frequency offset is determined as being from a smallest resource block (RB) index of the CORESET to a smallest RB index of the common RB overlapping with a first RB of the SS/PBCH block.

In step 812, $O_1$ and $O_2$ are determined, based on a one-to-one mapping, as given by $O_2 = O_1 \cdot R_{SCS} + BW_{SSB} - R_{SCS}/2 - BW_{SSB}/2$ where $R_{SCS} = SCS_1/SCS_2$, and $BW_{SSB}$ is a bandwidth of the SS/PBCH block in a unit of the RB.

In one embodiment, $O_1$ and $O_2$ are determined, based on a one-to-one mapping, as given by $O_2 = 2 \cdot O_1 + 10$.

Next, the UE in step 814 determines a frequency location of the CORESET based on the determined frequency offset.

Finally, the UE in step 816 receives a Type0-PDCCH based on the determined bandwidth, the number of symbols, and the frequency location of the CORESET.

In one embodiment, the UE determines the frequency offset as $O_1$ based on a determination of the subcarrier spacing of the SS/PBCH block as $SCS_1$ and determines the frequency offset as $O_2$ based on a determination of the subcarrier spacing of the SS/PBCH block as $SCS_2$.

In one embodiment, the UE determines whether a shared spectrum channel access in a frequency range 1 (FR1) is supported and sets $SCS_1$ as a 30 kHz, $SCS_2$ as a 15 kHz, and $BW_{SSB}$ as 20 RBs based on a determination that the shared spectrum channel access in the FR1 is supported.

In one embodiment, the UE determines the subcarrier spacing of the SS/PBCH block as a 30 kHz and determines the frequency offset as one of 0, 1, 2, or 3 RBs based on the MIB of the SS/PBCH block.

In one embodiment, the UE determines the subcarrier spacing of the SS/PBCH block as a 15 kHz and determines the frequency offset as one of 10, 12, 14, or 16 RBs based on the MIB of the SS/PBCH block.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver configured to receive a synchronization signals and physical broadcast channel (SS/PBCH) block; and
   a processor operably coupled to the transceiver, the processor configured to:
   determine a subcarrier spacing of the SS/PBCH block from a set of subcarrier spacings {15, 30} kilohertz (kHz);
   upon determining the subcarrier spacing of the SS/PBCH block as 30 kHz, determine a frequency offset as one of 0, 1, 2, or 3 resource blocks (RBs) based on a configuration in a master information block (MIB) of the SS/PBCH block;

upon determining the subcarrier spacing of the SS/PBCH block as 15 kHz, determine the frequency offset as one of 10, 12, 14, or 16 RBs based on the configuration in the MIB of the SS/PBCH block; and determine a frequency location of a control resource set (CORESET) based on the frequency offset, wherein the transceiver is further configured to receive a type0 physical downlink control channel (Type0-PDCCH) based on the frequency location of the CORESET.

2. The UE of claim 1, wherein the processor is further configured to:

determine a bandwidth of the CORESET based on the configuration in the MIB, and determine a number of symbols of the CORESET based on the configuration in the MIB.

3. The UE of claim 1, wherein:

the processor is further configured to determine a subcarrier spacing of a Type0-PDCCH common search space (CSS) set in the CORESET, and the subcarrier spacing of the Type0-PDCCH CSS set is the same as the subcarrier spacing of the SS/PBCH block.

4. The UE of claim 1, wherein the frequency offset is determined as being from a smallest RB index of the CORESET to a smallest RB index of a common RB overlapping with a first RB of the SS/PBCH block.

5. A base station (BS) in a wireless communication system, the BS comprising:

a transceiver configured to transmit a synchronization signals and physical broadcast channel (SS/PBCH) block; and a processor operably coupled to the transceiver, the processor configured to:

determine a subcarrier spacing of the SS/PBCH block from a set of subcarrier spacings {15, 30} kilohertz (kHz);

upon determining the subcarrier spacing of the SS/PBCH block as 30 kHz, determine a frequency offset as one of 0, 1, 2, or 3 resource blocks (RBs) based on a configuration in a master information block (MIB) of the SS/PBCH block;

upon determining the subcarrier spacing of the SS/PBCH block as 15 kHz, determine the frequency offset as one of 10, 12, 14, or 16 RBs based on the configuration in the MIB of the SS/PBCH block; and determine a frequency location of a control resource set (CORESET) based on the frequency offset, wherein the transceiver is further configured to transmit a type0 physical downlink control channel (Type0-PDCCH) based on the frequency location of the CORESET.

6. The BS of claim 5, wherein the processor is further configured to:

determine a bandwidth of the CORESET based on the configuration in the MIB, and determine a number of symbols of the CORESET based on the configuration in the MIB.

7. The BS of claim 5, wherein:

the processor is further configured to determine a subcarrier spacing of a Type0-PDCCH common search space (CSS) set in the CORESET, and the subcarrier spacing of the Type0-PDCCH CSS set is the same as the subcarrier spacing of the SS/PBCH block.

8. The BS of claim 5, wherein the frequency offset is determined as being from a smallest RB index of the CORESET to a smallest RB index of a common RB overlapping with a first RB of the SS/PBCH block.

9. A method for operating a user equipment (UE) in a wireless communication system, the method comprising:

receiving a synchronization signals and physical broadcast channel (SS/PBCH) block;

determining a subcarrier spacing of the SS/PBCH block from a set of subcarrier spacings {15, 30} kilohertz (kHz);

based on determining the subcarrier spacing of the SS/PBCH block as 30 kHz, determining a frequency offset as one of 0, 1, 2, or 3 resource blocks (RBs) based on a configuration in a master information block (MIB) of the SS/PBCH block;

based on determining the subcarrier spacing of the SS/PBCH block as 15 kHz, determining the frequency offset as one of 10, 12, 14, or 16 RBs based on the configuration in the MIB of the SS/PBCH block;

determining a frequency location of a control resource set (CORESET) based on the frequency offset; and receiving a type0 physical downlink control channel (Type0-PDCCH) based on the frequency location of the CORESET.

10. The method of claim 9, further comprising:

determining a bandwidth of the CORESET based on the configuration in the MIB, and determining a number of symbols of the CORESET based on the configuration in the MIB.

11. The method of claim 9, further comprising:

determining a subcarrier spacing of a Type0-PDCCH common search space (CSS) set in the CORESET, wherein the subcarrier spacing of the Type0-PDCCH CSS set is the same as the subcarrier spacing of the SS/PBCH block.

12. The method of claim 9, wherein the frequency offset is determined as being from a smallest RB index of the CORESET to a smallest RB index of a common RB overlapping with a first RB of the SS/PBCH block.

* * * * *